Sept. 3, 1968          A. E. VOGEL          3,399,905

CONTROLLED SUSPENSION SYSTEM FOR VEHICLES

Original Filed April 23, 1956          12 Sheets-Sheet 1

INVENTOR.
ARTHUR E. VOGEL
BY
*Schmieding and Fultz*
ATTORNEYS

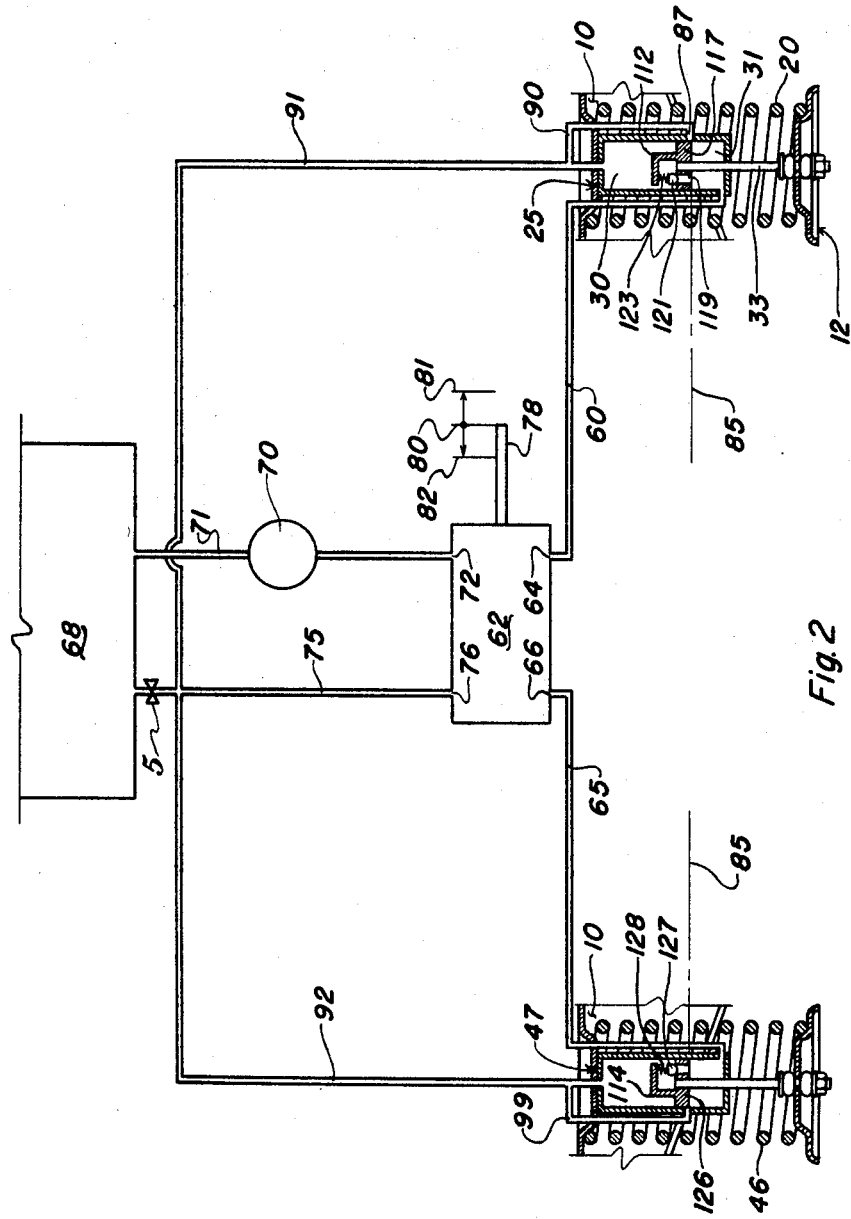

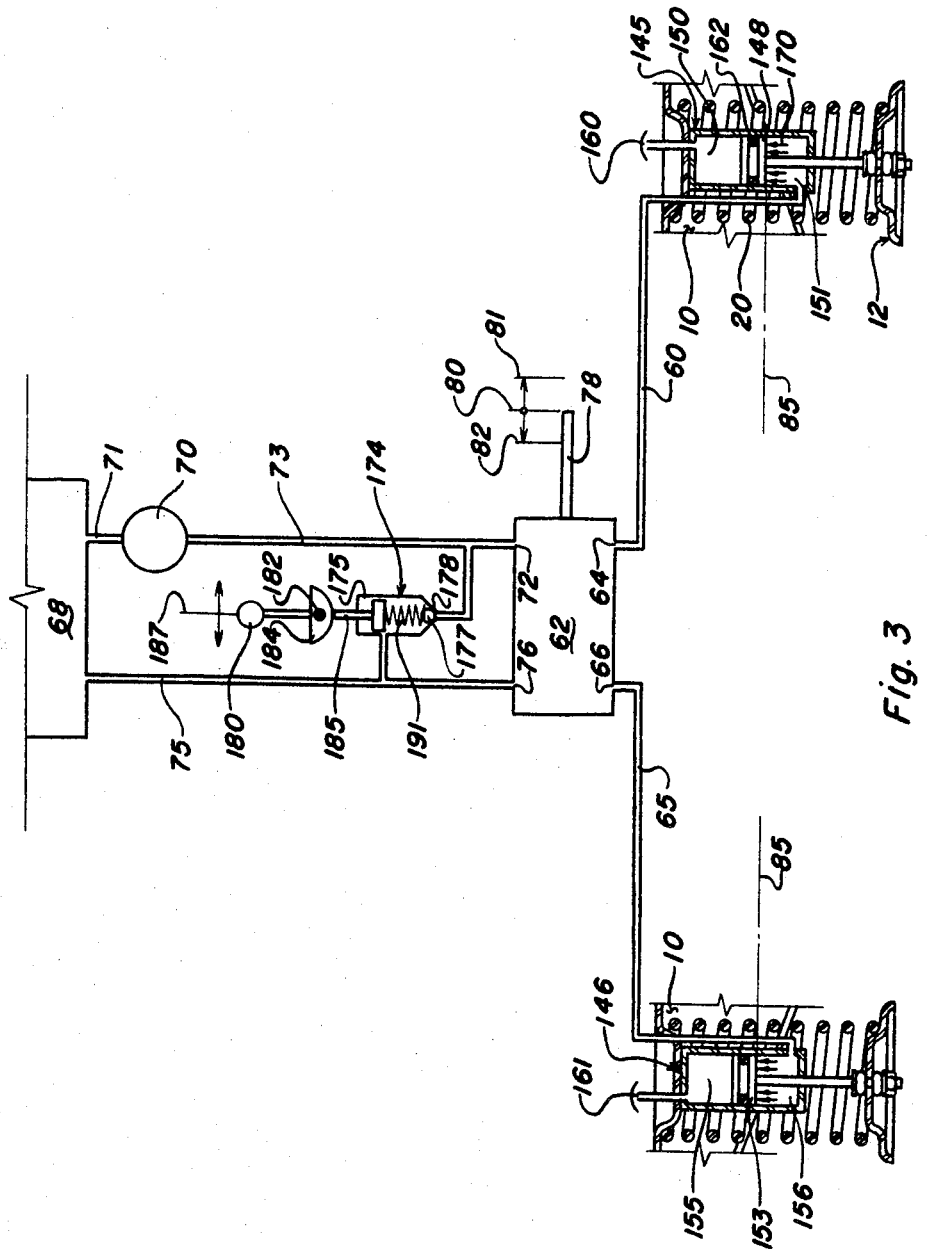

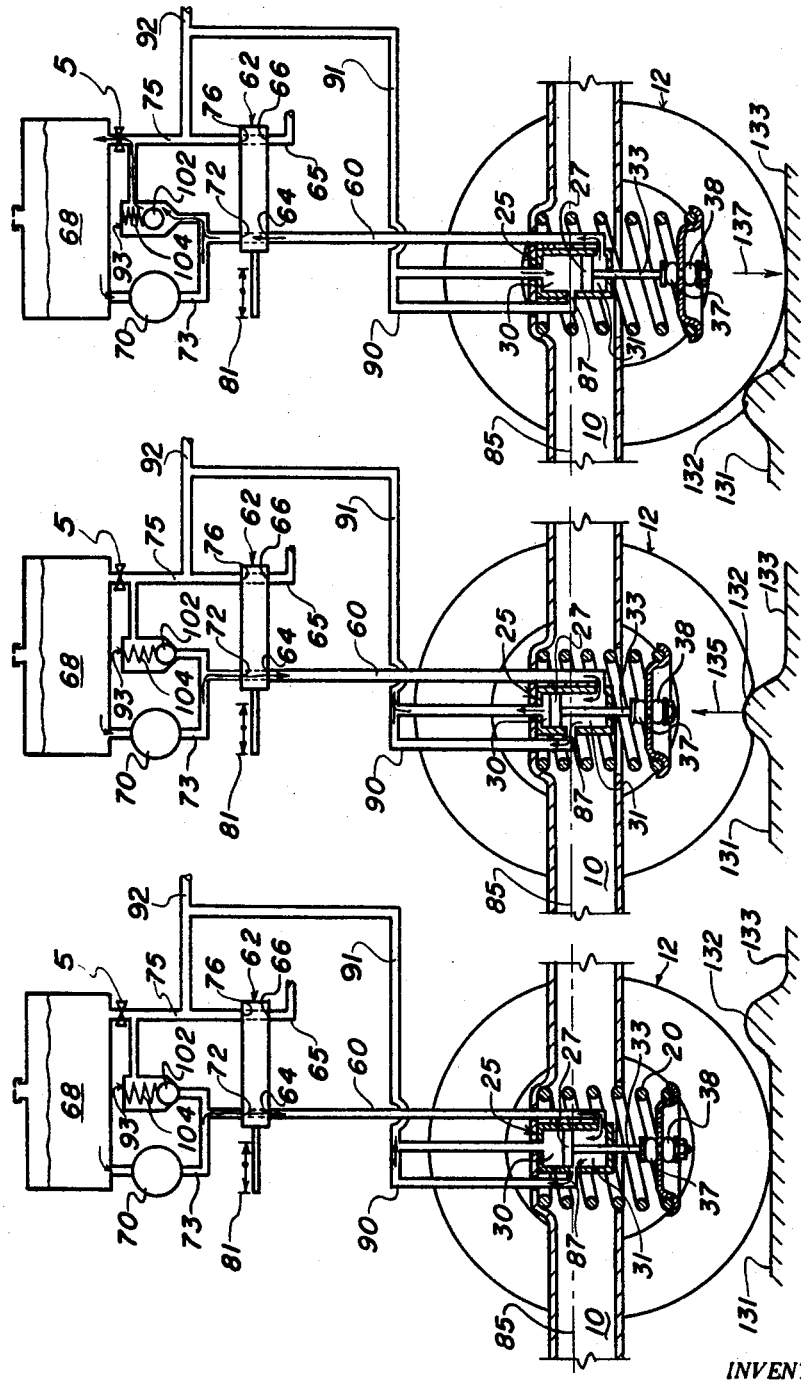

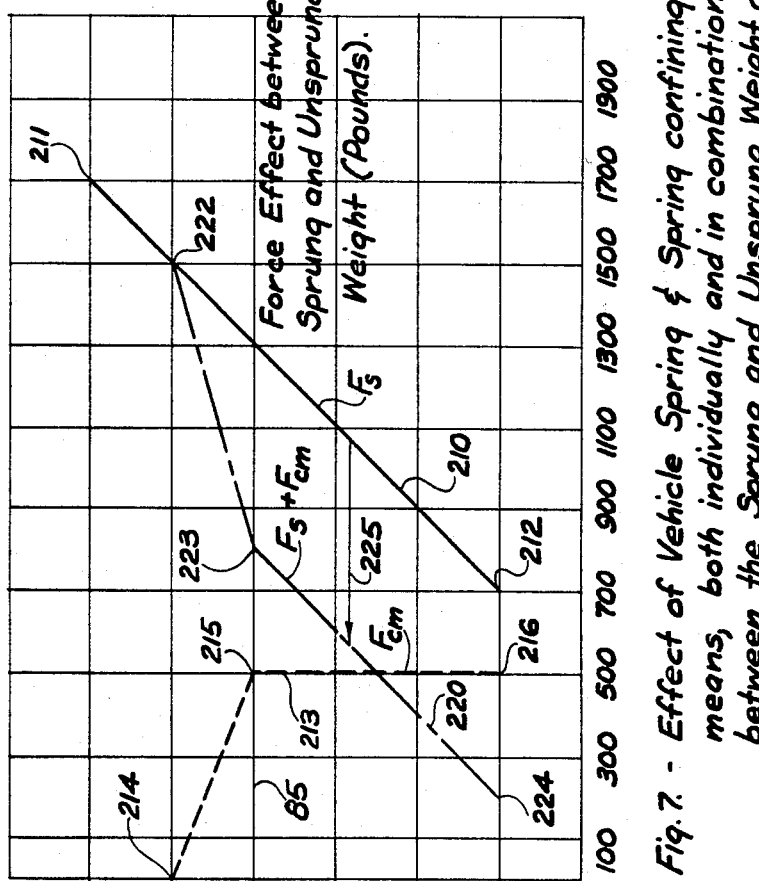

Sept. 3, 1968 A. E. VOGEL 3,399,905
CONTROLLED SUSPENSION SYSTEM FOR VEHICLES
Original Filed April 23, 1956 12 Sheets-Sheet 6

Relationship of Confining Force Applied at Vehicle Spring
To the Decrease in Static Load Applied to Vehicle Spring by
Sprung Weight for Various Magnitudes of Centrifugal Force
Imposed on Vehicle.

INVENTOR.
ARTHUR E. VOGEL
BY
Schmieding and Fultz
ATTORNEYS

Relationship of Confining Means Pressure to Road Imposed Impacts at Various Magnitudes of Centrifugal Force for Apparatus of Fig. 1 & Fig. 2

Relationship of Confining Means Pressure to Road Imposed Impacts at Various Magnitudes of Centrifugal Force for Apparatus of Figure 3.

INVENTOR.
ARTHUR E. VOGEL
BY
Schmieding and Fultz
ATTORNEYS

INVENTOR.
ARTHUR E. VOGEL
BY
Schmieding and Fultz
ATTORNEYS

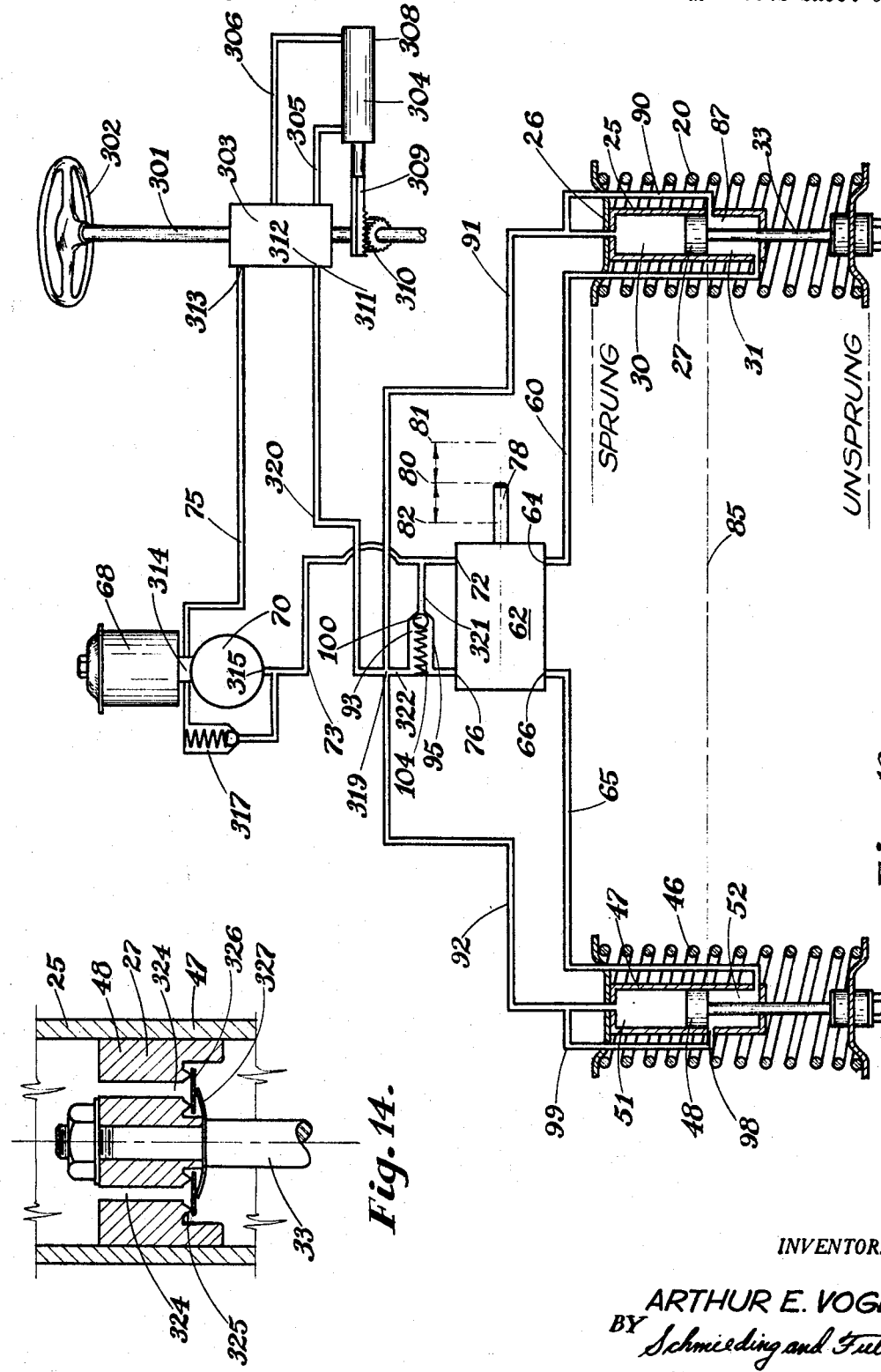

INVENTOR.
ARTHUR E. VOGEL
BY
Schmieding and Fultz
ATTORNEYS

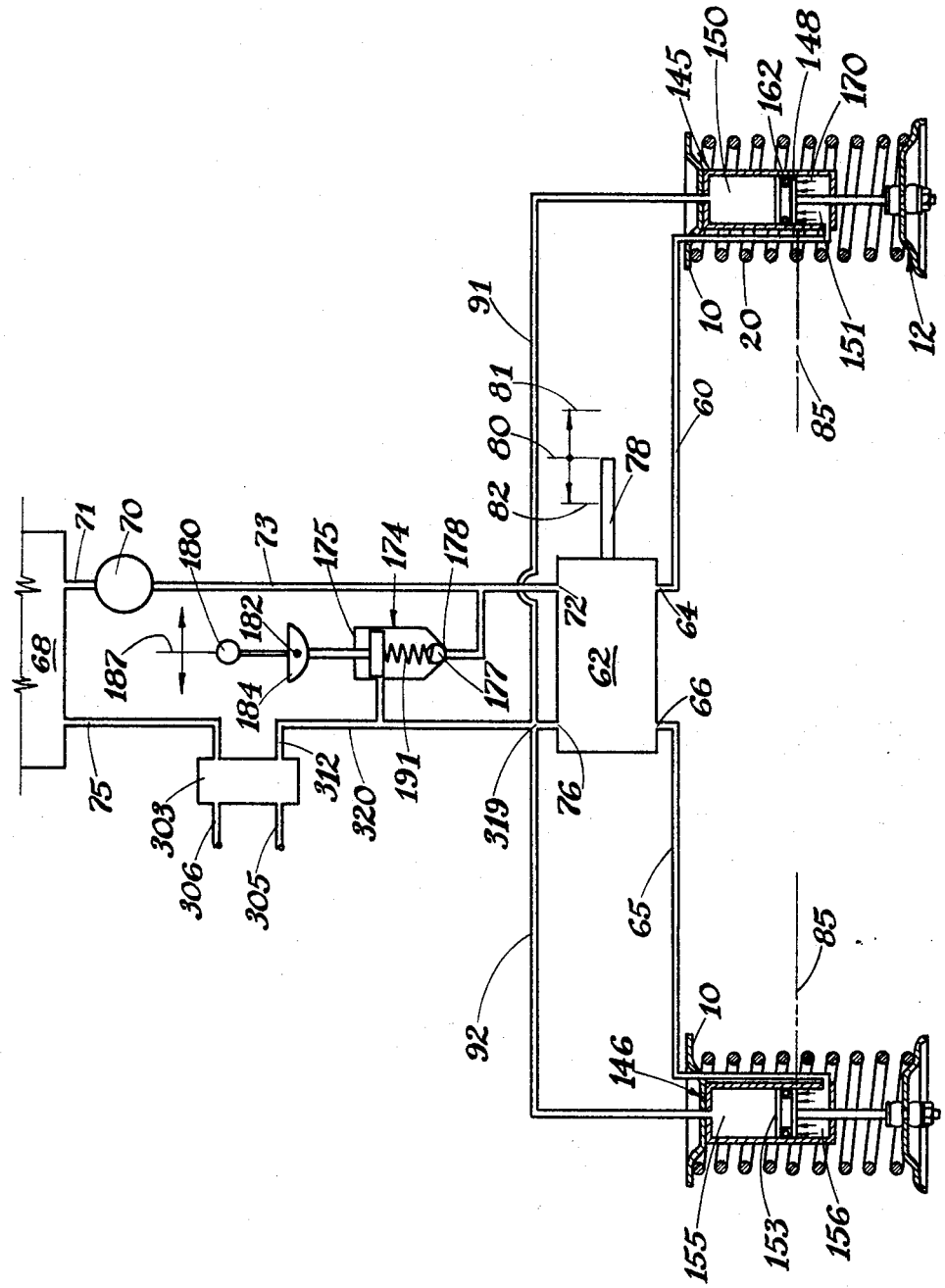

United States Patent Office 3,399,905
Patented Sept. 3, 1968

3,399,905
CONTROLLED SUSPENSION SYSTEM
FOR VEHICLES
Arthur E. Vogel, Columbus, Ohio, assignor, by mesne assignments, of one-fourth to Arthur E. Vogel, Columbus, one-fourth to Robert Dawson, Coshocton, one-fourth to Warren H. F. Schmieding, Columbus, and one-fourth to Palmer Fultz, Columbus, Ohio
Continuation of application Ser. No. 136,121, June 17, 1961, which is a division of application Ser. No. 579,928, Apr. 23, 1956, which is a continuation-in-part of application Ser. No. 541,370, Oct. 19, 1955, which in turn is a continuation-in-part of application Ser. No. 519,038, June 3, 1955. This application Aug. 27, 1965, Ser. No. 491,474
22 Claims. (Cl. 280—124)

ABSTRACT OF THE DISCLOSURE

A controlled suspension system for vehicles of the type that include sprung and unsprung weight portions and springs on opposite sides thereof wherein fluid actuated suspension control means are selectively energized and deenergized by a fluid system provided with fluid pressure limiting means. As another aspect the fluid system incorporates novel control valve means wherein relatively movable walls are connected between the sprung and unsprung weights and include position command orifice means for controlling the height of said sprung weight portion. As still another aspect, the fluid control system can be adapted for the dual function of operating both the controlled suspension system and another powered component of the vehicle from a common constant volume source of pressurized fluid.

---

This invention relates to suspension system for vehicles and more particularly to an apparatus for varying the effect of spring energy between the sprung and unsprung weights of the vehicle.

The present application is a continuation of my co-pending application S.N. 136,121, filed June 17, 1961, now abandoned, which is a division of S.N. 579,928, now Patent No. 2,992,836, filed Apr. 23, 1956, which is a continuation-in-part of my co-pending application S.N. 541,-370, filed Oct. 19, 1955, now abandoned, which is a continuation-in-part of my prior application S.N. 519,038, filed June 3, 1955, now abandoned.

The conventional motor vehicle is ordinarily provided with springs between the body and the wheels of the vehicles so that such springs will absorb shocks and jars of the vehicle to provide safer and more comfortable riding for the occupants.

When the vehicle is rounding curves, however, the springs at the wheels on the side of the vehicle nearer to the center of the curve push upward on such side of the vehicle due to the fact that energy is stored in such springs by the normal weight of the vehicle. Such upward spring force helps to disturb the stability or actually upset the vehicle when rounding a curve by augmenting the centrifugal force that is concurrently exerted on the vehicle due to the fact that the vehicle is undergoing a change in direction.

The present invention constitutes an improvement in apparatus of the type disclosed in my co-pending application Ser. No. 332,651 now Patent No. 2,960,349, filed Jan. 22, 1953, which type of apparatus eliminates a force detrimental to the cornering characteristics of a vehicle by decreasing the effect of stored spring energy on the side of the vehicle body nearer to the center of the curve being negotiated. Other advantages of this type of apparatus are set forth in detail in the above mentioned patent.

It is therefore an object of the present invention to provide an improved apparatus of the above described type that utilizes non-compressible hydraulic fluid to provide compactness of size and hence adaptability to present vehicle suspension systems, yet which is flexibly indestructible, when actuated, to provide the desired spring energy confinement, under all adverse road surface conditions encountered in rounding a curve.

It is another object of the present invention to provide a controlled suspension system for vehicles which effects confinement of energy stored in the vehicle spring and which incorporates a novel automatic control system for yieldably maintaining and automatically returning the suspension system to a predetermined confined configuration while the vehicle is negotiating a curve.

It is another object of the present invention to provide a novel controlled suspension system of the type described which may be adapted to incorporate complete independence, one from the other, of the suspension apparatus at the right side of the vehicle and the suspension apparatus at the left side of the vehicle.

It is another object of the present invention to provide a controlled suspension system of the type described which incorporates a novel automatic control system adapted to apply confining action for preventing the unloading of stored spring energy, such confining action being applied so as to permit yielding the suspension above a predetermined confining force, and being applied against only one direction of suspension movement, whereby said suspension system can move in said one direction when road impact forces exceed said predetermined confining force, and whereby said suspension system retains its normal capacity to move in the other direction.

It is another object of the present invention to provide a controlled suspension system of the type described which incorporates a novel automatic control system adapted to apply confining action for preventing the unloading of stored spring energy, such confining action being automatically variably applied, in proportion to the confining action required, as increases and decreases in centrifugal force are encountered by the vehicle. As a result, the release of stored spring energy is prevented in all cornering conditions encountered, yet the ultimate in suspension flexibility and riding comfort is realized when rough road surface conditions are encountered for all curve radii and vehicle velocities.

It is still another object of the present invention to provide a novel controlled suspension system adapted to permit the elimination of separate shock absorber units, and which safely allows the elimination of what is commonly termed an anti-roll or transverse torsion bar, conventionally interconnected between the two sides of the front suspension system of a vehicle. By eliminating the latter not only can complete independence of the two front wheel suspensions be safely achieved, but the adverse effect, encountered when a conventional anti-roll bar unloads stored energy in the latter half of an S-curve, is completely eliminated.

A still further object of the present invention is to utilize the hydraulic pump of the standard hydraulic steering system, or other fluid actuated vehicle component system, in a hydraulic mechanism for controlling the suspension system of the vehicle.

It is still another object of the present invention to provide a controlled suspension system for vehicles which incorporates a novel automatic control apparatus that yieldably automatically retains the suspension system at a predetermined normal configuration datum whereby the vehicle is automatically levelized under various magnitudes and distributions of loads applied to the vehicle.

A still further object of the present invention is to utilize the hydraulic pump of the standard hydraulic steering system, or other fluid actuated vehicle component system, to operate a novel hydraulic levelizing means adapted for use with such pump to resiliently maintain the sprung and unsprung weights of the vehicle at a predetermined normal configuration under variations in loading thereof.

It is still another object of the present invention to provide a novel controlled suspension system which rapidly institute anti-roll corrections, anti-pitch corrections, or both such corrections when inertia forces are encountered by the vehicle, which effect corrections for variations in static weight at a relatively slow rate, and which continue to have the capacity to rapidly effect corrections for a time interval subsequent to the termination of said inertia forces.

It is still another object of the present invention to provide a novel fluid flow rate controller for a controlled suspension system of the type having fluid actuated means connected between sprung and unsprung weights, said flow rate controller being adapted to supply fluid to said means at a low volumetric flow rate, and to automatically supply fluid to said means at a higher flow rate responsive to inertia forces encountered by the vehicle.

It is still another object of the present invention to provide a novel fluid flow rate controller for the fluid actuated means of a controlled vehicle suspension system, said flow rate controller being adapted to control the flow rates of both fluid being translated to said fluid actuated means and fluid being released from said fluid actuated means.

It is still another object of the present invention to provide a novel fluid flow rate controller for the fluid actuated means of a controlled vehicle suspension system, said flow rate controller including an inertia responsive actuating means, and means for effecting a time delay in the operation of said inertia responsive actuating means.

It is still another object of the present invention to provide a controlled suspension system that includes a novel control valve means provided by relatively movable walls connected between the sprung and unsprung weights which walls include position command orifice means for controlling the height of the sprung weight portion.

Other objects and advantages of the present invention will be apparent from the following description, reference being had to the accompanying drawings wherein a preferred form of embodiment of the invention is clearly shown.

In the drawings:

FIG. 2 is a diagrammatic view showing a second apparatus constituting a second aspect of the present invention;

FIG. 3 is a diagrammatic view showing a third apparatus constituting a third aspect of the present invention;

FIG. 4 is a diagrammatic view provided to illustrate the operation of an apparatus constructed according to the present invention when such apparatus is actuated and the vehicle is negotiating a curve;

FIG. 5 is a view corresponding to FIG. 4 and showing the operation of said apparatus when the wheel, at which spring energy is being confined, encounters rough road conditions in said curve;

FIG. 6 is a view corresponding to FIGS. 4 and 5 which view shows additional operational functions of the apparatus when the vehicle is encountering said rough road conditions;

Figure 1:
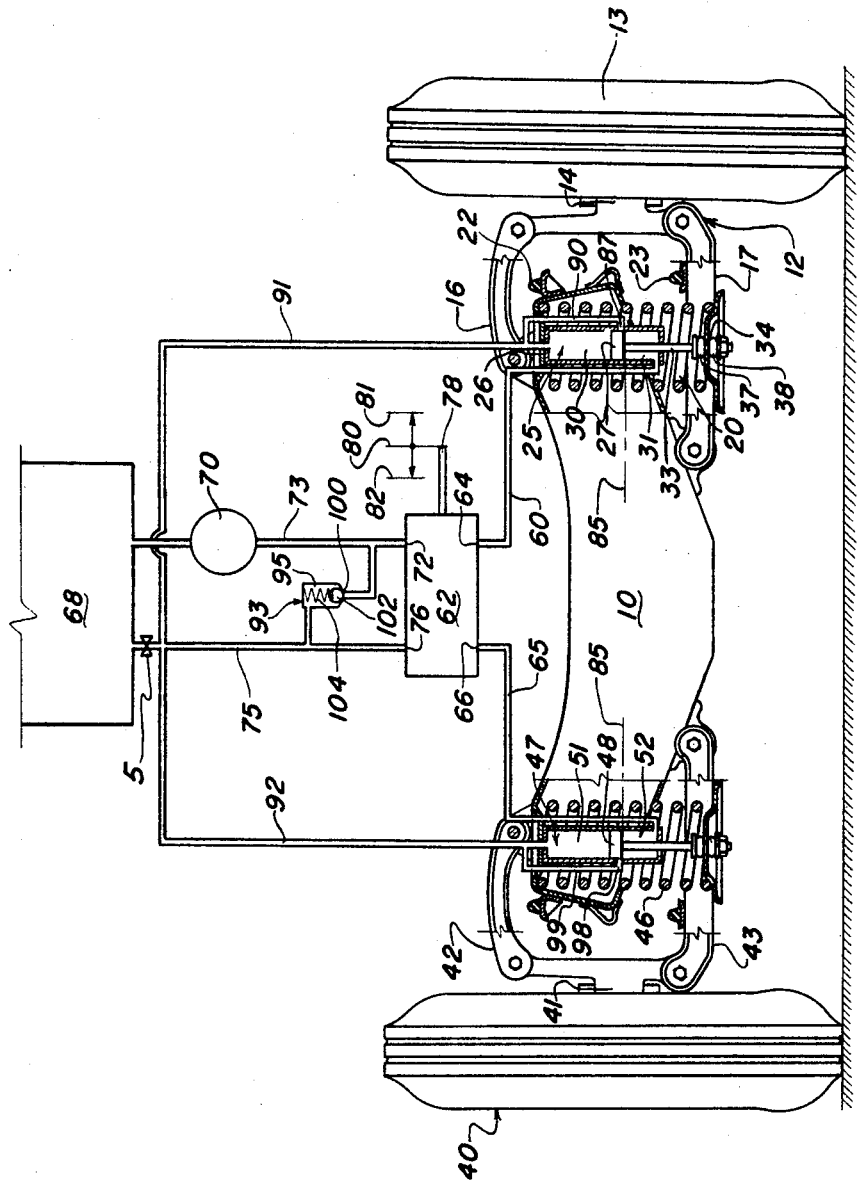
FIG. 1 is a diagrammatic view showing an apparatus constructed according to the present invention and applied to a typical suspension system of a motor vehicle.
Figure 8:
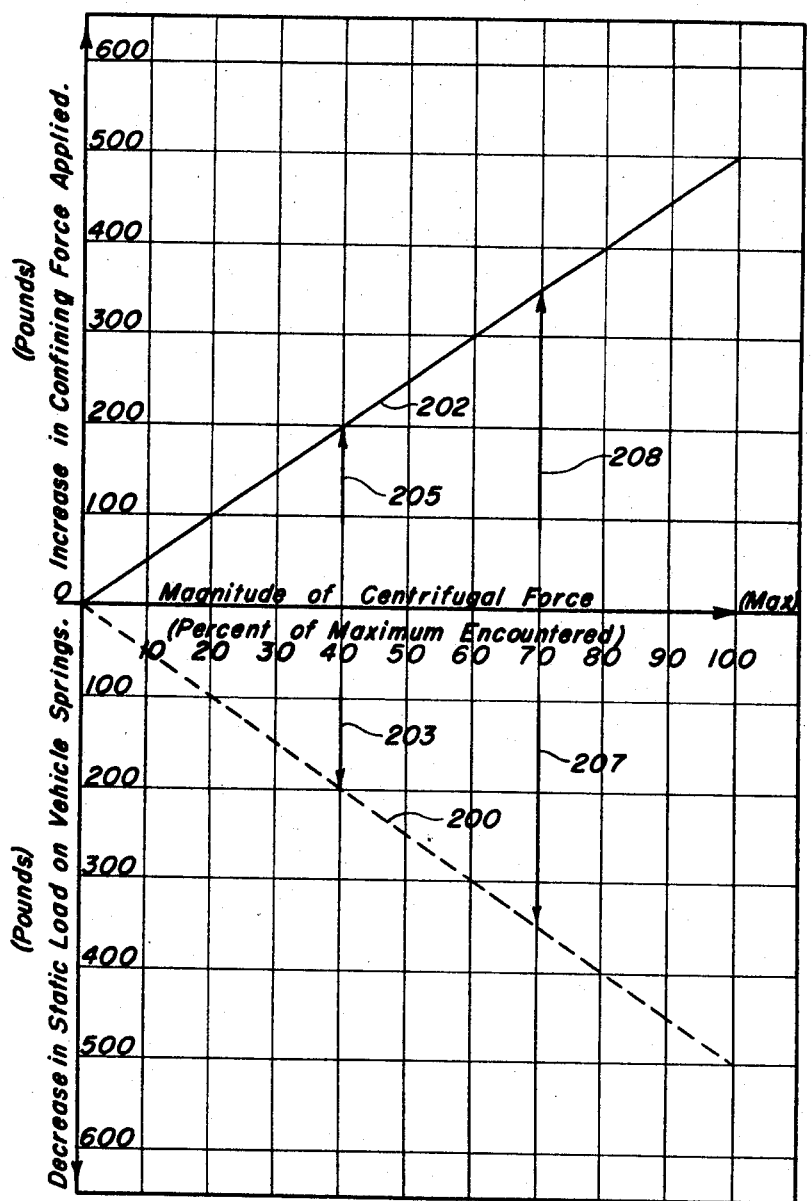
Figure 9:
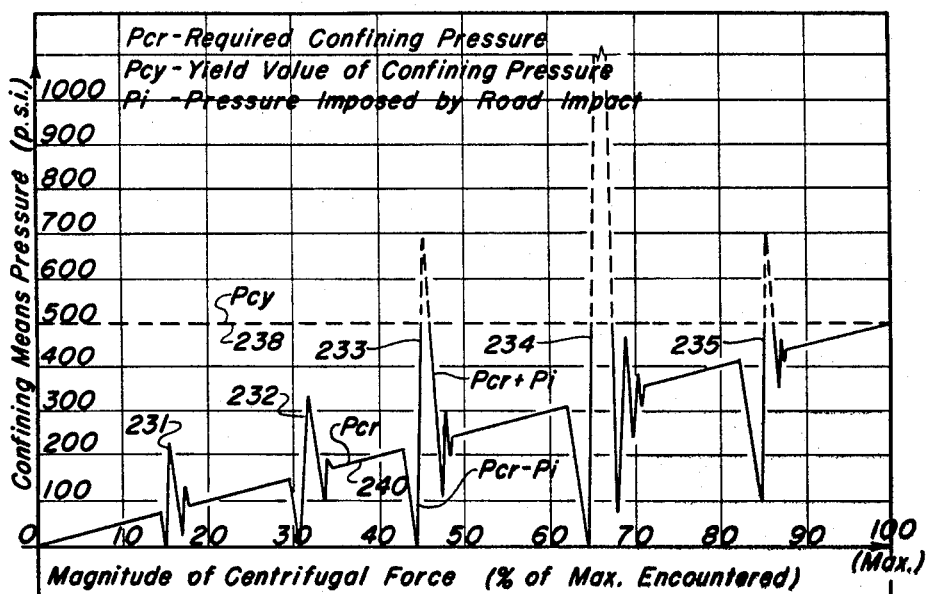
Figure 10:
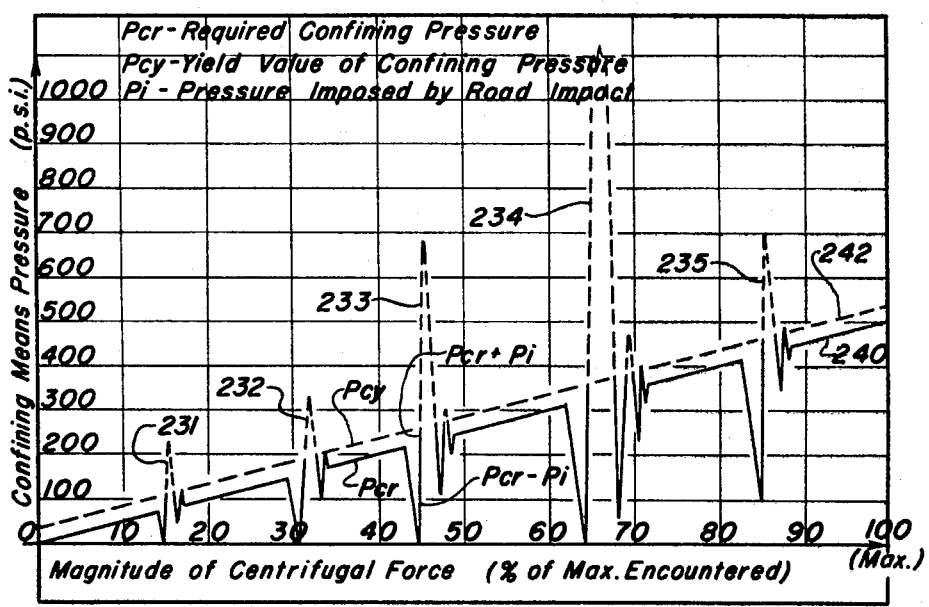
Figure 12:
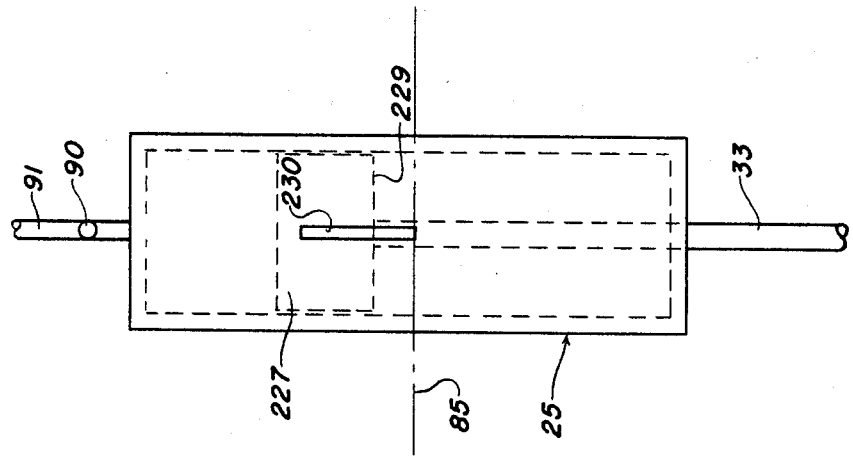
Figure 11:
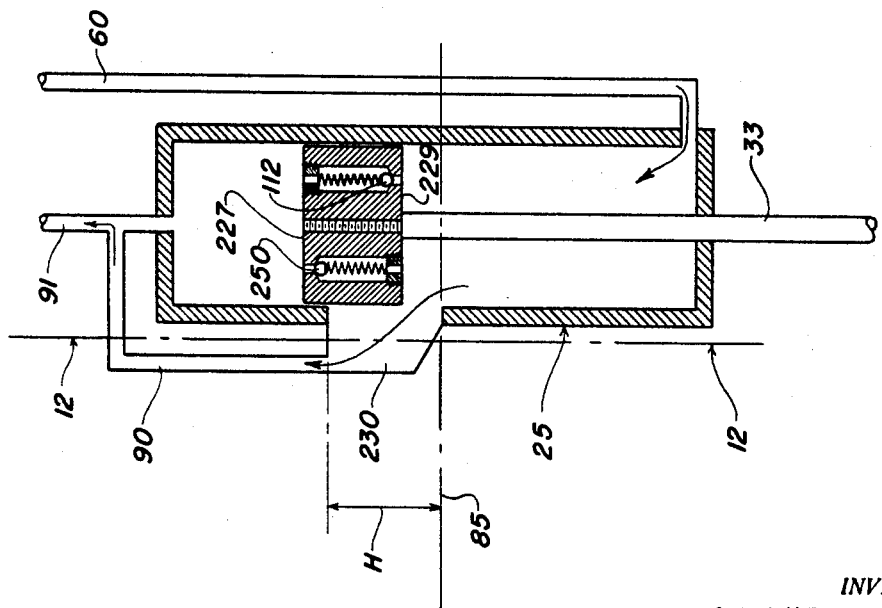
Figure 17:
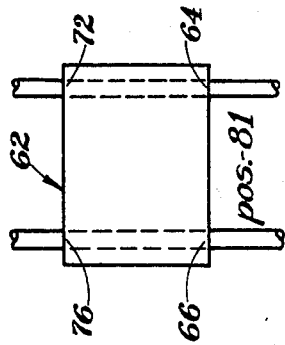
Figure 16:
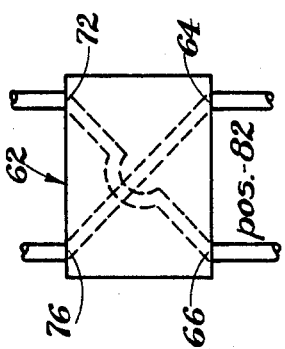
Figure 15:
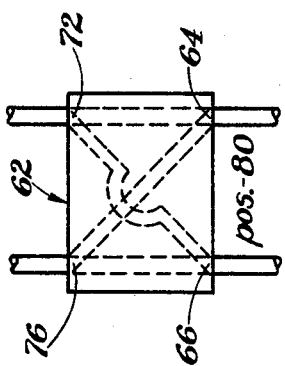
Figure 20:
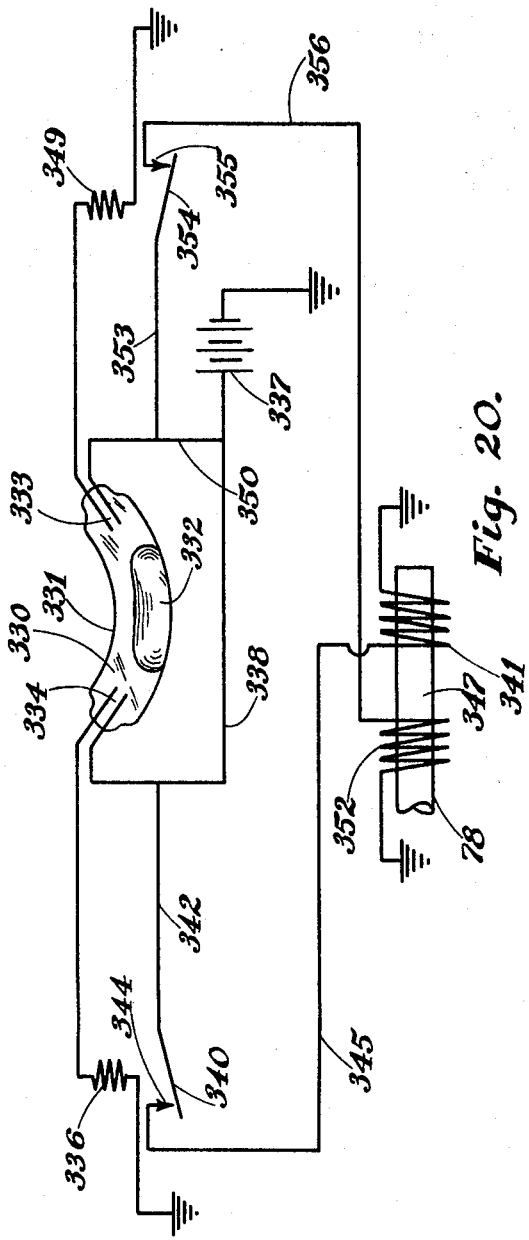
Figure 18:
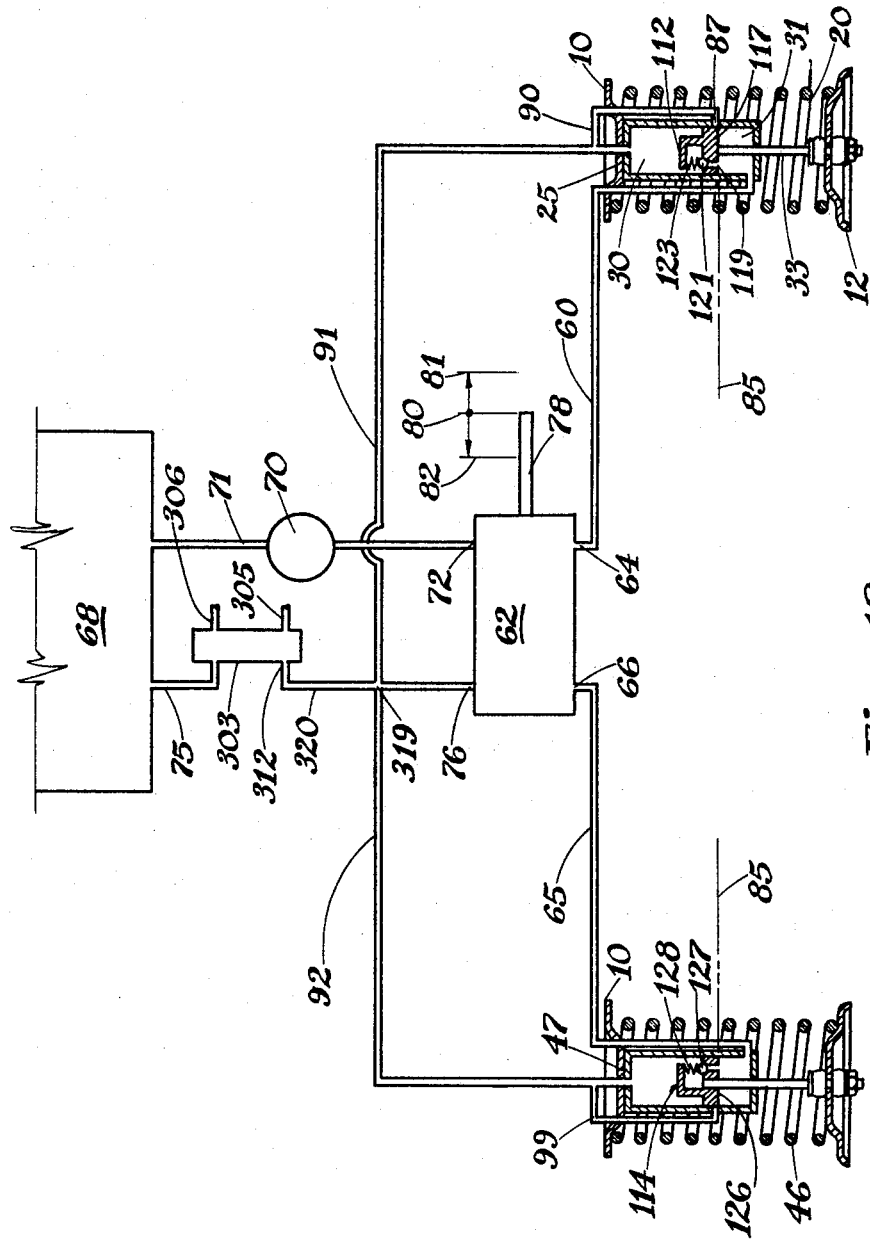

FIG. 7 is a graph showing the magnitude of forces exerted by a vehicle suspension spring, between the sprung and unsprung weight of a typical vehicle, for various displacements of the sprung weight above and below a normal static configuration. In addition, the graph illustrates modifications of effect, on the vehicle body, of such exerted forces, such modifications being provided by the present invention;

FIG. 8 is a graph showing, for one aspect of the present invention, the relationship of the confining force applied to the vehicle spring to the decreases in static load applied to the vehicle spring by the spring weight of the vehicle, for various magnitudes of centrifugal force imposed on the vehicle while cornering;

FIG. 9 is a graph showing, for one aspect of the present invention, the relationship of fluid pressure in the present apparatus, when actuated, for various centrifugal force conditions encountered. This graph also illustrates the effect of road impacts on fluid pressure in the apparatus when actuated;

FIG. 10 is a graph illustrating the relationship between the same factors as in FIG. 9 but for another aspect of the present invention;

FIG. 11 is a side sectional view of a confining means constructed according to the present invention, said section being taken along a plane through the vertical centerline thereof;

FIG. 12 is a second side view, partially in section, of the means of FIG. 11, said section being taken along line 12—12 of FIG. 11;

FIG. 13 is a diagrammatic view of the apparatus incorporated in FIG. 1, but including a hydraulic system incorporating both hydraulic steering and hydraulic roll control mechanism;

FIG. 14 is a fragmentary view in cross section of one of the cylinders shown in FIG. 13 and showing the piston in cross section so as to more clearly depict the check valve therein;

FIGS. 15, 16, and 17 are diagrammatic views of the control valve showing the same in various positions;

FIG. 18 is a diagrammatic view of the apparatus incorporated in FIG. 2, but including a hydraulic system incorporating both hydraulic steering and hydraulic roll control mechanisms;

FIG. 19 is a diagrammatic view of the apparatus incorporated in FIG. 3, but including a hydraulic system incorporating both hydraulic steering and hydraulic roll control mechanisms; and FIG. 20 is a diagrammatic view of an electrical system utilized for shifting a control valve of the hydraulic system.

Referring next to FIG. 1 of the drawings, a frame, or sprung weight, of a typical motor vehicle is indicated generally at 10. FIG. 1 is a view, partially diagrammatic, of the apparatus of the present invention, with the wheels and suspension system appearing essentially as seen from the front of the vehicle.

A left front wheel and control arm assembly, indicated generally at 12, constitute a portion of the unsprung weight of the vehicle, with such assembly including wheel 13, axle 14, and an upper and lower control arm, indicated at 16 and 17 respectively. A left front spring 20 is interposed between the sprung weight 10 and the unsprung weight 12, and resilient bumpers 22 and 23 provide cushioning effects at the upper and lower limits of relative movement between the sprung and unsprung weight.

A suspension control means which may be in the form of a hydraulic confining cylinder 25 is provided with its upper end secured to frame 10 at 26, with such cylinder being fitted with a piston 27 which isolates an upper chamber 30 from a lower chamber 31. Piston 27 is mounted on a rod 33 connected to the lower control arm assembly at 34 such that relative movement, between the frame 10 and the upsprung weight assembly 12 causes piston 27 to reciprocate in cylinder 25. The rubber elements 37 and 38 provide a cushioned flexible connection between rod 33 and control arm assembly 34.

With continued reference to FIG. 1, a right front wheel and control arm assembly is indicated generally at 40, which assembly includes an axle 41 and an upper and lower control arm designated 42 and 43, respectively.

The right front side of the vehicle includes additional elements corresponding to those described for the left front side, and, for purposes of describing the present invention, the important elements consist of a right spring 46, a suspension control means which may be in the form of a hydraulic confining cylinder 47, provided with a piston 48 which divides the cylinder into an upper chamber 51 isolated from a lower chamber 52.

As seen in FIG. 1, a line 60 connects lower chamber 31, of confining means 25, with a valve means 62 at a port 64. In a similar manner, a line 65 connects lower chamber 52 with the other confining means 47 to valve 62 at a port 66. A reservoir means 68 continuously supplies hydraulic fluid to valve 62 by means of a fluid translating means such as a pump 70 which receives fluid from reservoir 68 through a line 71 and delivers fluid to a port 72 of valve means 62 through a line 73. A line 75 provides for the return of fluid from a port 76, of valve 62, back to reservoir 68. A restrictor 5 which may be formed as a small orifice, is provided in return line 75 to prevent cavitation on either side of piston 27 or 48 during rapid oscillation caused by road irregularities.

With particular reference to fluid translating means 70, such means may be in the form of a constant volume pump, driven by the vehicle engine, adapted to continuously deliver fluid at a constant volume independent of variations in the r.p.m. of the vehicle engine.

The valve means 62 is preferably of a three-position open center type arranged to form a common connection between the four ports 64, 66, 72, and 76, when the actuating rod 78 is at a centered position indicated at 80. When the actuating rod is shifted to one side position 81, as seen in FIG. 17, port 72 is connected only with port 64 whereby lower chamber 31 of the confining means 25 is connected to pump 70, and port 76 is only connected to port 66 whereby lower chamber 52 of the other confining means 47 is connected to reservoir 68.

It will be noted, in FIG. 1, that with the valve 62 in such position 81, left confining means 25 is placed in circuit with pump 70, with the right confining means 47 being isolated from such circuit, and from the effect of pump 70. Such high pressure connection of one of the confining means, and isolation of the other confining means may be effected by a single valve of the appropriate type described above.

With valve means 62 shifted to the other position 82, as seen in FIG. 16, port 72 is connected only with port 66 whereby pump 70 delivers fluid to lower chamber 52 of the right confining means 47, and port 76 is connected only with port 64 whereby lower chamber 31 of left confining means 25 is placed in communication with reservoir 68.

It will therefore be seen that valve 62 being of a three-position, open centered, spool type, serves as a single valve unit for either connecting left confining means 25 with pump 70, while right confining means 47 is completely isolated from the effect of the pump, or for connecting right confining means 47 with pump 70 while completely isolating confining means 25 from the effect of the pump.

In view of the above, it will be understood that when fluid is being pumped to the left confining means 25, with the valve 62 in position 81, an upwardly directed force will be exerted on the upper surface of piston 27 due to the fluid pressure in lower chamber 31 so long as the under surface of piston 27 is located at or below a confinement position datum line indicated at 85. This condition will be true since, according to the present invention, a position command orifice 87 is closed against the escape of hydraulic fluid when the lower surface of piston 26 is at or below the confinement position datum line 85. Moreover, when fluid pressure is present in lower chamber 31, due to the position command orifice 87 being closed by piston 27, a confining action will be exerted on vehicle spring 20 whereby such spring will be prevented from unloading stored spring energy when the vehicle is negotiating a curve.

It will be further understood that pressure is automatically produced in chamber 31, responsive to the action of suitable control means adapted to move valve means 62 to position 81 when the vehicle is negotiating a curve. This occurs when confining means 25 is nearest the center of the curve being negotiated whereby the vehicle spring at the inner side of the vehicle will be prevented from unloading stored spring energy on the sprung weight on such side, which unloading if allowed to occur, would augment centrifugal force and cause outward lean or actual upsetting of the vehicle.

With continued reference to FIG. 1, and assuming that the left confining means 25 is connected to the fluid translating means 70, it will be understood that when piston 27 is driven upwardly with the unsprung weight 12, which action occurs when the inner wheel, constituting a portion of such unsprung weight strikes a protruding bump while the vehicle is cornering to the left, then the position command orifice 87 will open whereby fluid is free to leave lower chamber 30 through such orifice. It will be noted that when fluid leaves position command orifice 87 it passes through a line 90 which connects with a fluid return line 91 leading to reservoir 68. After the upward departure of piston 27 above confinement datum line 85, and so long as piston 27 is above such datum line, pump 70 delivers fluid through lines 73, 60, lower chamber 31, and then outwardly through position command orifice 87 to reservoir 68. Hence no fluid pressure is available for maintaining piston 27 at any position above the confinement datum line 85. When piston 27 returns downwardly, after the effect of the impact, it will continue such downward movement to and below datum line 85 and, as the position command orifice 87 will close, causing pressure to be present in lower chamber 31.

Due to the downward intertia of unsprung weight 12, produced by the expanding action of spring 20 and the static weight of such unsprung weight, extreme impact forces would occur, and extreme pressures would be experienced in lower chamber 31, if piston 27 were to be immediately arrested, in its downward travel, when its lower surface arrives at confinement datum line 85. Accordingly, a fluid actuated valve means, or pressure control means, indicated generally at 93, is provided to permit the escape of hydraulic fluid from the high pressure pump circuit, with such escape of fluid being completely prevented below a predetermined fluid pressure valve, which pressure valve is predetermined to be of sufficient magnitude to effect the desired spring energy confinement, at spring 20, against any magnitudes of centrifugal forces to be encountered by the particular vehicle.

It has been discovered, according to the present invention, that only a relatively small confining force of approximately 500 pounds, applied to the location of spring 20, is sufficient to effect the desired results of the present invention for a conventional passenger motor vehicle. Such force is sufficient to effect complete spring confinement, at normal configuration datum, for the most severe centrifugal force values ever encountered in operating a typical passenger motor vehicle. Such predetermined force value will, of course, vary with different vehicles depending on the physical characteristics such as the weight and suspension geometry.

With particular reference to fluid actuated valve means, or pressure control means 93, such means include a chamber 95 connected between high pressure line 73 and reservoir return line 75. Fluid actuated valve means, or pressure control means 93 includes a seat 100 adapted to receive a pressure actuated valve element 102, the element 102 being constantly urged against seat 100 by a predetermined preloaded force provided by a spring means 104.

It will be understood that the preloaded force, exerted by spring means 104 in retaining element 102 closed against seat 100, is determined by appropriate calculations to determine a yield pressure at which element 102 will be forced open by fluid action from the high pressure portion of the hydraulic circuit. Such yield pressure is determined to correspond to the particular predetermined confining force required at vehicle spring 20 to prevent such spring from unloading energy under the most adverse centrifugal force conditions to be encountered by the particular vehicle.

The above described yield pressure value, at which the escape of fluid from the high pressure portion of circuit to reservoir occurs, during the downward travel of piston 27 beyond the position command orifice 87, is, according to the present invention, established at the lowest pressure value, which will produce the required confinement. As a result, the unsprung weight 12, including the wheel, can readily travel downwardly, below the confined suspension configuration when rough road conditions are encountered. Hence the wheel will follow the uneven portions of the road surface, which when the vehicle is cornering, will provide superior ride characteristics in a manner later to be described in detail herein.

Referring to the right confining means 47, it will be understood that a position command orifice 98, and lines 99 and 92 leading back to reservoir, serve to maintain and return the right confining means 47 at the confinement position datum line 85 in the same manner described above for left confining means 25. As has been previously stated, such action occurs at the right confining means 47 only when the vehicle is turning to the right at which time valve means 62 is at position 82 wherein pump 70 delivers fluid to the right confining means 47, and wherein the left confining means 25 is isolated from the high pressure portion of the circuit.

It will be understood that when either of the confining means 25 or 47 is isolated from the high pressure portion of the circuit by valve means 62, which condition occurs when the vehicle is turning in a direction away from the non-actuated confining means, then such non-actuated confining means will have no effect on its respective suspension side but will merely follow the normal upward and downward movement of the suspension. This will occur because, in such instances, both the upper and lower chamber of the particular non-actuated confining means will be connected only with reservoir and isolated from the high pressure portion of circuit. As a result of such complete isolation of the two confining means, one from the other, the upper and lower chamber of the non-actuated confining means are pressure balanced at low values and the suspension side that it is adapted to control will possess its normal freedom to follow protrusions and depressions in the road independently of any interconnection with and effect from the actuated confining means at the other suspension side, which other suspension side is being independently controlled by said actuated confining means.

When the vehicle is traveling in a straight path each of the ports 64, 66, 72, and 76 of valve 62 are commonly connected whereby the upper and lower chambers of each of the two confining means 25 and 47 are pressure balanced at some low pressure value due to the slight back pressure imposed by restriction in line 320 to the flow of fluid from pump 70 back to reservoir 68. Such restriction may be provided by a power steering unit 303 or by other fluid restricting means as explained in the previously mentioned co-pending application Ser. No. 541,370 now abandoned.

Reference is next made to FIG. 2 which illustrates a second aspect of the present invention. The components of the system of FIG. 2, and the functioning thereof, are substantially identical to the aspect of FIG. 1 with two exceptions. First, the fluid actuated valve means, or pressure control means 93, of FIG. 1, has been eliminated from between high pressure line 73 and reservoir return line 75, and second, two separate fluid pressure limiting means have been internally incorporated in the confining means 25 and 27, with such fluid pressure control or limiting means being indicated generally at 112 and 114, respectively.

With particular reference to the left spring confining means 25 of FIG. 2, the rod 33 thereof is shown fitted with a piston 117 provided with a fluid passage 119. A fluid actuated valve member 121 is normally urged against closure of the upper end of passage 119 by means of a preloaded spring means 123.

The preloaded force exerted by spring means 123 determines the fluid pressure at which fluid is permitted to escape, from the high pressure side of the system to reservoir, when the lower surface of piston 117 is at or below the confinement position datum line 85. Hence, in view of the previously described operations of the aspect of FIG. 1 it will be understood that when centrifugal forces are being encountered without road impacts, with confining means 25 actuated, the preloaded spring means 123 prevents the opening of pressure limiting means 112 and an appropriate pressure will be maintained in lower chamber 31 of a predetermined magnitude required to effect complete prevention of release of the energy stored in vehicle spring 20. When a protruding road bump is encountered, however, piston 117 moves upwardly, with the wheel and unsprung weight, and then downwardly to and below confinement position datum line 85. As piston 117 passes downwardly beyond datum 85, the force exerted by the violent downward movement of the unsprung weight 12 causes pressure limiting means 112 to be driven open as soon as piston 117 closes position command orifice 87. When downward movement of unsprung weight 12 subsides valve member 121 closes and fluid in lower chamber 31, produced by the action of pump 70, then exerts a force on the lower surface of piston 117, with such pressure serving to return and maintain piston 117 with its lower surface at confinement position datum line 85. The left suspension is thereby maintained in the desired configuration of spring confinement throughout the balance of the curve or until another rough road condition is encountered. In the latter event, the confining means will undergo another cycle of yielding after which it will again return to the normal position of confinement illustrated.

With continued reference to FIG. 2, right confining means 47 is provided with an identical fluid pressure control or limiting means 114 which comprises a piston 126, valve member 127, and spring means 128.

Reference is next made to FIGS. 4, 5, and 6, which are provided for the purpose of illustrating the dynamic functioning of the apparatus of FIG. 1 when rough road conditions are encountered in a curve. It will be noted that each of the FIGS. 4, 5, and 6 depict the same vehicle, including sprung weight portion 10 and unsprung weight portion 12, encountering the same rough road conditions. Such condition includes a level road surface portion 131 followed by a protruding bump 132, which is in turn followed by a depressed road surface portion 133 as would be caused by a hole in the road surface. In each of the FIGS. 4, 5, and 6, the vehicle is negotiating a curve, with the apparatus of the present invention actuated.

The unsprung weight 12 and spring 20, illustrated in each of these FIGS. 4, 5, and 6, represent the front unsprung weight and vehicle spring at the side of the vehicle nearest the center of the curve being rounded. Hence spring 20 is the spring at which stored energy must be confined in order to effect the results of the present invention.

With reference to FIG. 4, the first of the sequence of views showing the dynamic operation of the apparatus, valve means 62 has been shifted to the previously described position 80 wherein port 72 is connected only with port 64, and, accordingly, confining means 25 is connected with the pump 70. At the same time, port 76 is connected only with port 66 whereby the other confining means 47, not illustrated, is connected with reservoir 68 and isolated from the effect of the pump. Hence lower chamber 31 is subjected to pressure by the fluid from pump 70 whereby an upward force is exerted on the under surface of piston 27 to retain the suspension at the confinement position datum line 85. Hence, even though spring 20 has the capacity to expand due to its confined energy, and would ordinarily do so when centrifugal force is acting on the vehicle body, the actuated confining means 25 restrains such unloading of energy and completely eliminates, up to the previously described yield pressure, any departure of the left suspension side from the confined configuration datum 85. As previously described, the left suspension side will depart from datum line 85 under road impacts, since no fluid pressure is present in the upper chamber 30 to prevent upward movement of the sprung weight, and since the yield pressure value will be exceeded in lower chamber 31 when the unsprung weight 12 seeks to move downwardly below confinement configuration under road imposed impact forces of sufficient magnitude to produce yielding of the fluid actuated valve means, or pressure control means 93 against the preloaded force means provided therein. Fluid actuated valve means, or pressure control means 93, however, will never yield responsive to pressure values imposed by centrifugal force along since the predetermined yield pressure, provided by the physical characteristics of spring means 104, is predetermined to resist maximum pressures that will be imposed by such centrifugal force, for the particular vehicle weight and configuration, under the severest cornering conditions.

It will be noted, in FIG. 4, that valve element 102 is closed since the vehicle wheel is traveling along flat road surface 131 and protruding bump 132 has not yet been encountered. As seen in FIGS. 4, with the confining means 25 in an actuated configuration, the pump 70 continuously pumps fluid through valve 62, line 60, lower chamber 31, and out through position command orifice 87 to reservoir. Fluid pressure in chamber 31 forces piston 27 upwardly only enough to permit the escape, through position command orifice 87, of the volumetric delivery of the pump. Piston 27 is prevented from moving below the confinement datum line 85 since, as soon as the lower surface of piston 27 approaches, coincidence with datum line 85, then position command orifice 87 proceeds to close with a corresponding build-up in pressure in lower chamber 31. Such increase in pressure forces piston 27 sufficiently upwardly to permit escape, through position command orifice 87, of the volumetric delivery of the pump. The fluid leaving orifice 87 then passes through lines 90 and 91 back to tank 68.

When the upsprung weight 12 of the vehicle encounters a bump 132, as seen in FIG. 5, the wheel and unsprung weight move more or less violently upwardly, depending on the magnitude of the bump, as is indicated by the arrow 135. At the same time, piston 27 follows upwardly, as illustrated in FIG. 5, with such movement of piston 27 driving fluid out of upper chamber 30 and through line 91 to reservoir 68.

With further reference to FIG. 5, it is seen that pump 70 continues to supply fluid through connected ports 72 and 64 of valve means 62, and through line 60 into lower chamber 31. As piston 27 moves upwardly, along with the unsprung weight of the vehicle encountering the bump, additional fluid from the pump is taken into lower chamber 31, and any excess of fluid being delivered by the pump passes to reservoir 68, through line 91, along with the fluid being exhausted from upper chamber 30. Since position command orifice 87 is completely open, with piston 27 above confinement position datum line 85, the fluid pressure in lower chamber 31 and in the normally high pressure portion of the circuit will fall to a relatively low pressure value below that of FIG. 4. Fluid actuated valve means, or pressure control means 93 will, of course, remain in the closed configuration, illustrated in FIG. 5, wherein element 102 is maintained seated by the preloaded spring means 104.

It should be pointed out that, for the purpose of analysis, it is assumed, in FIG. 5, that the frame or sprung weight 10 of the vehicle is still at the same level above the road surface 131 due to its relatively great weight and inertia to movement, and that the unsprung weight 12, due to its relatively low inertia, moves upwardly relative to frame 10 when protrusion 132 is encountered. Then the vehicle spring 20 is further compressed with the result that additional energy is stored therein. The assumption that frame 10 remains at the same height is substantially accurate where protruding bump 132 is of relatively short duration, since unsprung weight 12 will actually move upwardly to negotiate the protrusion 132 and be moving downwardly, as indicated by arrow 137 in FIG. 6, without frame 10 having made any substantial vertical movement relative to the road surface 131. This condition is, of course, ideal from the standpoint of riding comfort since the passengers will not feel the effect of protrusion 132.

Again, in FIG. 6, at the instant of operation illustrated, the frame 10 is still substantially at the same height above the road surface 131 as in the two preceding views, since the unsprung weight 12 has passed beyond protrusion 132 and is being driven violently downwardly due to its static weight and the expanding action of the previously confined and compressed vehicle spring 20.

It is at this particular condition of dynamic functioning of the suspension system, illustrated in FIG. 6, that the ultimate in violent shock impacts would be imposed on the hydraulic system of the present invention if the fluid actuated valve means, or pressure control means 93 were not provided. If such means were not present, piston 27, in the course of traveling downwardly from the upper position of FIG. 5, would be violently stopped in encountering the position command orifice 87 since, in such assumed instance, the bottom surface of piston would suddenly encounter an absolute hydraulic impediment to further downward travel and extremely high pressures would be suddenly imposed on the system. According to the present invention, however, such high fluid pressures can never occur since, as piston 27 moves violently downwardly in confining means 25, and as position command orifice 87 is closed by piston 27, the fluid pressure in lower chamber 31 will immediately reach, but never exceed, the predetermined yield pressure value at which fluid actuated valve means, or pressure control means 93 is forced open as illustrated. Such pressure relief occurs since hydraulic fluid can move out of lower chamber 31, up through line 60 and valve means 62, and out through the fluid actuated valve means, or pressure control means 93 to reservoir 68 in the manner illustrated by the flow arrows in FIG. 6. Since pump 70 is continuously actuated, the fluid actuated valve means, or pressure control means 93 further serves to provide an escape to reservoir for the fluid being delivered by the pump as illustrated by the flow arrow in line 73 of FIG. 6. It will be understood that the predetermined yield pressure, required to open the fluid actuated valve means, or pressure control means 93, is less than the fluid pressure provided by continuously operated pump 70. That is, in designing the system for a particular vehicle, a pump is selected with a pressure capacity greater than the fluid pressure yield value required for the particular vehicle.

After the violent downward movement of the unsprung weight 12 is yieldably absorbed by fluid actuated valve means, or pressure control means 93, as shown in dynamic configuration of FIG. 6, the wheel will return either to the depressed road surface 133, or to the normal road surface 131, depending on the particular road conditions. After this occurs, the sprung weight 10 will either drop downwardly, or the unsprung weight 12 will move upwardly either of which will bring piston 27 upwardly past the confinement position datum line 85. That is, the suspension will inherently move, from a configuration of FIG. 6, back to and somewhat beyond the normal confined configuration. After piston 27 moves upwardly beyond position command orifice 87 and the lower surface of the piston passes and returns to the orifice, then the suspension will again be confined, in the configuration illustrated in FIG. 4, by the action of pump 70. It will be understood that fluid actuated valve means, or pressure control means 93 will automatically return to the closed position due to the action of preloaded spring 104 urging element 102 against its seat. This automatic closing action of fluid actuated valve means, or pressure control means 93 occurs since, when piston 27 returns upwardly from the configuration of FIG. 6, the high pressure condition in lower chamber 31, which opened fluid actuated valve means, or pressure control means 93, will no longer be imposed on the system.

After the system returns from the configuration of FIG. 6 to the configuration of FIG. 4 as described above, the pump 70 will continue to translate fluid into lower chamber 31, in the manner illustrated in FIG. 4, to maintain sufficient pressure for exerting the required confining action on vehicle spring 20 throughout the balance of the curve being negotiated, or until another cycle of suspension yielding will occur at the confined wheel, followed by the return of the suspenion to the confined configuration of FIG. 4, all in the manner described above.

With reference to the dynamic operation of the previously described apparatus of FIG. 2, it is sufficient to state that the function will be substantially identical to that of the apparatus of FIG. 1 except that escape of high pressure fluid, above the predetermined yield pressure value, will occur between lower chamber 31 and upper chamber 30, instead of between high pressure line 73 and low pressure return line 75. This difference is present in the apparatus of FIG. 2 since the fluid pressure limiting means 112 is located internally within confining means 25 instead of externally as is the case with fluid actuated valve means, or pressure control means 93 of FIG. 1.

In view of the above description it will be understood that the aspects of the present invention just described each incorporate not only position command control means, which senses departure of the suspension from the predetermined confined configuration and returns the suspension thereto, but in addition include pressure limiting means which serves to protect the components of the hydraulic system from exposure to any high fluid pressures of impacts which would otherwise produce rough riding characteristics, and, in fact, under severe road impacts, cause failure of the hydraulic components of the system.

Reference is next made to FIG. 3 which illustrates still another aspect of the present invention. The apparatus of FIG. 3 includes certain components identical to those of the previously described apparatuses of FIG. 1 and FIG. 2 such as reservoir 68, fluid translating means 70, and open center three-position valve 62, all of which have previously been described in detail herein.

The frame or sprung weight is again designated 10 and the unsprung weight, including the vehicle wheel, is generally indicated at 12, with a vehicle spring 20 being shown operatively connected therebetween.

As seen in FIG. 3 a left confining means and a right confining means are indicated generally at 145 and 146, respectively, with such confining means differing from the previously described confining means 25 and 47 in that no position command orifice 87 and 98 are utilized.

With particular reference to confining means 145, a piston 148 separates an upper chamber 150 from a lower chamber 151. The right confining means 146 is similarly provided with a piston 153 separating an upper chamber 155 from a lower chamber 156.

The upper chambers 150 and 155 of the left and right confining means respectively, are each continuously maintained in communication with the atmosphere by a breather schematically illustrated at 160 and 161. The lower, high pressure chamber 151 of the left confining means 145 is connected to valve means 62 by high pressure line 60, and, in a similar manner, the high pressure chamber 156 of right confining means 146 is connected to valve means 62 by high pressure line 65. It should be noted that when valve means 62 is shifted from the center position 80 illustrated in FIG. 3, to a left position 81, the high pressure chamber 151 of left confining means is connected with pump 70 since port 72 is, in that position, only connected with port 64. At the same time, with valve means 62 shifted to position 81, the right confining means 146 will be completely isolated from the pump 70 and the high pressure of the system since port 76 will only be in communication with port 66. Accordingly, lower chamber 156 of the right confining means 146 is placed in communication with reservoir 68 by lines 65 and 75, and such right confining means is thereby maintained completely free to follow the normal unimpaired operation of the right side of suspension system.

With particular reference to the left confining means 145, and confinement configuration datum line 85, it will be understood that piston 148 will be maintained at such datum line 85 when the fluid pressure on the under surface of piston 148, the effect of which is illustrated at 170, is of sufficient magnitude to prevent the expanding and unloading of stored spring energy, by spring 20, as the effective static load on such spring is decreased in cornering to the left.

According to the present invention, the apparatus of FIG. 3 serves to variably maintain a confining pressure value at 170 of a magnitude only great enough to just compensate for the particular magnitude of centrifugal force being encountered at the particular moment of operation. Such confining pressure is constantly and variably maintained at 170 in proportion to variations in centrifugal force, such that piston 148 is continuously maintained at confinement datum line 85, when the vehicle is cornering, with such confinement at datum continuing so long as no uneven road surface conditions are encountered. With this arrangement the suspension, at the particular confining means being actuated, is continuously maintained in a confined configuration wherein the unloading of energy is prevented at spring 20. At the same time piston 148 is yieldably positioned vertically intermediate the upper and lower limits of its travel in confining means 45 such that piston 148, and the unsprung weight connected therewith, are free to move in either direction, either upwardly or downwardly, relative to sprung weight 10, when depressions and protrusions in the road surface are encountered.

Since the confining pressure at 170 is maintained only great enough to compensate for the centrifugal force being encountered, for any given speed of the vehicle, the confined suspension will readily yield to road impacts at all vehicle speeds and under all cornering conditions. This advantage, providing the ultimate in riding comfort, is effected by a variable control means, indicated generally at 174, connected between the high pressure line 73 and the return line 75 to reservoir. Control means 147 includes a housing 175 which encloses a pressure actuated valve element 177 engageable with a seat 178. A suitable detector element 180, which is adapted to sense variations of the magnitude of centrifugal force to which the vehicle is being subjected, is provided for control means 174, with such detector 180 being schematically illustrated as an inverted pendulum pivoted at 182 for lateral movement in either direction. Detector 180 includes a cam member 184 arranged to move a plunger element 185 downwardly upon movement of the detector element 180 either to the right or left of a central position 187. It will be understood, from the schematic representation of variable control means 174, that the greater the departure, in either direction, of the sensing element 180 from the central position, the greater will be the downwardly exerted force on valve element 177, which force urges element 177 toward seated contact with seat 178.

In operation of variable control means 174 when the vehicle is negotiating a curve at relatively low velocity, or where the curve is of relatively large radius, or when both conditions are present, the centrifugal force to which the vehicle is subjected will be relatively low whereby the departure of sensing element 180, from the central position, will be relatively slight. Accordingly, valve element 177 can readily yield to the fluid pressure of the fluid being translated by the pump, and, as a result, the magnitude of pressure 170 exerted on the bottom of piston 148 will be relatively low since only a relatively low pressure is, in such instance, required to maintain confinement of stored energy at spring 20 under the relatively low centrifugal force being encountered.

As the centrifugal force in the turn increases, or when a different more intense curve is being negotiated, the departure of sensing element 180, from the control position illustrated, will be greater, and the downward bias on valve element 177 will be increased. Accordingly, the fluid being translated by pump 70 will less readily escape through the variable control means 174 with the result that a greater fluid effect will be exerted on the under side of piston 148. Hence a greater confining force, required under the higher centrifugal force, is automatically provided.

In view of the above description it will be understood that as the magnitude of centrifugal force increases or decreases, the magnitude of the corresponding confining pressure 170 is proportionately increased and decreased so as to maintain the forces at the suspension system in equilibrium at configuration in which piston 148 is coincident with confining configuration datum line 85.

Referring again to variable control means 174 of FIG. 3, it will be noted that a compression spring 191 is interposed between plunger 185 and valve element 177, with such spring 191 serving as a fluid pressure limiting means to protect the system from high pressures which would be imposed by rough road conditions were the limiting means not provided.

When a road impact is encountered, of the type previously described in connection with FIGS. 4, 5, and 6, piston 148 will be driven rapidly upwardly by the unsprung weight to which it is attached. Immediately afterwards the piston will be drawn rapidly downwardly due to the static weight of such unsprung weight, and due to the unloading of vehicle spring 20 in the manner previously described and illustrated in FIG. 6. As piston 148 is moved downwardly after the impact, the most severe forces to which the system is subjected will occur, and, at this point, the present apparatus is adapted to permit the rapid release of fluid from the high pressure side of system whereby the build-up of high fluid pressures is completely prevented. Such fluid release occurs, through variable control means 174 and return line 75 to reservoir, when spring means 191 rapidly yields under a fluid pressure slightly above the required confining pressure. Hence the suspension can, under all conditions, readily yield without at any time being over confined from the standpoint of achieving the ultimate in riding comfort.

After the road impact condition has been negotiated, spring means 191 will return from its yielded compressed configuration and the system will seek the equilibrium configuration illustrated in FIG. 3 and maintain same throughout the balance of the curve or until another rough road condition is encountered.

Reference is next made to FIG. 8 which constitutes a graphical illustration of the functioning of the apparatus of FIG. 3, and, in particular, the operation of variable pressure limiting means 174 in maintaining a confining force of varying intensity and of a magnitude appropriate to compensate for the effect of the particular magnitude of centrifugal forces to which the vehicle is ever subjected during operation thereof. As seen in FIG. 8, a dotted line 200, commencing at zero pounds force, at zero centrifugal force, and progressing to a maximum of 500 pounds force, at maximum centrifugal force, represents the decrease in static load at the vehicle spring requiring confinement. Hence such dotted line 200 represents the capacity, at various centrifugal force values, of such spring to unload stored spring energy were it not subjected to confinement by the apparatus of the present invention.

Referring next to the upper portion of the graph of FIG. 8, the solid line commencing at zero and progressing to a maximum of 500 pounds force for the maximum centrifugal force to be encountered, illustrates the variable corresponding rate at which the confining force, and hence confining pressure, are applied to the suspension by the apparatus illustrated in FIG. 3. For example, when the centrifugal force being encountered is forty percent of maximum, it is seen, at arrow 203, that the decrease in static load on the inner vehicle spring is 200 pounds. Hence the vehicle spring has the capacity to unload 200 pounds of the total force it is exerting upwardly on the sprung weight 10 of the vehicle. Accordingly, the vertically directed arrow 205 graphically illustrates that a confining force of identical magnitude is being applied in the opposite direction. At an arbitrarily selected higher centrifugal force value, such as seventy percent of maximum, the downwardly directed arrow 207 shows that the decrease in static load at the inner spring of the vehicle is 350 pounds. Due to the variable pressure limiting means 174 of FIG. 3, an appropriate confining force is automatically applied, such confining force being of an equal magnitude but in the opposite direction as indicated by vertically directed arrow 208. This same relationship will be present for all magnitudes of centrifugal force throughout the range thereof to which the vehicle is subjected.

As previously described herein, for a conventional passenger vehicle it has been discovered that a confining force of only approximately 500 pounds is required to completely effect confinement of the suspension against the effect of centrifugal force when such is at the maximum value under the most severe cornering conditions. Accordingly, it will be understood that with the apparatus of FIG. 3 the maximum yield pressure, which variable control means 174 must provide for the system, at maximum centrifugal force, need never be greater than the pressure required to produce 500 pounds force, is exerted at the spring axis of a conventional motor vehicle. This represents a practical example so if the area of the under surface of piston 148 is selected to be one square inch and if the maximum confining force ever required is 500 pounds, then the maximum hydraulic pressure to which the system of FIG. 3 would ever be subjected is 500 pounds per square inch.

It will of course be understood that the value of 500 pounds, and the corresponding pressure value of 500 pounds per square inch, are only used as practical examples, and that such values will vary according to the weight and physical characteristics of the particular vehicle to which the invention is applied.

Reference is next made to FIG. 7 which graphically illustrates the spring confining effect of the apparatus of FIG. 1 or the apparatus of FIG. 2 for various suspension configurations encountered during operation of a conventional passenger vehicle to which either of such apparatuses has been applied. The line 210 represents the force effect of the vehicle spring 20 alone. It is seen from the graph that such spring exerts an upwardly directed force of approximately 1300 pounds on the frame or sprung weight 10. This force is due to the normal compression of such spring by the static weight of the vehicle. With further reference to line 210, it is seen that the force effect of vehicle spring 20 alone increases to a maximum of 1700 pounds at the upper limit 211 of suspension travel, with such force effect decreasing to a minimum of 700 pounds at the lower limit 212 of suspension travel.

Reference is next made to line 213 which illustrates the effect of spring confining means 25 or 47 considered along, it being seen that the effect of such confining means commences at zero pounds force, when the unsprung weight 12 is at some position 214 above confinement configuration datum line 85, and increases to a maximum confining force value of 500 pounds at the confinement position datum line 85 as seen at 215. For any suspension configurations below datum line 85, the effect of confining means 25 or 47 alone is a constant 500 pounds force as represented by the portion of line 213 lying between the numerals 215 and 216.

In continuing the consideration of the graph of FIG. 7, line 22 represents the combined effect, between sprung and unsprung weight, of both vehicle spring 20 and confining means 25. From the portion of line 220 above datum line 85 it is seen that the effect of confining means 25 commences at some point 222, above datum line 85, and increases to its maximum modifying effect of 500 pounds commencing at datum line 85 as indicated at 223. The combined effect of both spring 20 and confining means 85 is seen to be 500 pounds less than the effect of spring 20 alone, for all suspension positions below datum line 85, as is represented by the portion of line 220 lying between points 223 and 224. Such constant 500 pound decreases in effect, produced by confining means 25 on vehicle spring 20, is represented, both as to magnitude and direction of application, by arrow 25 extending between the lines 210 and 220 in the graph of FIG. 7.

With reference to the portions of lines 213 and 220 which extend above confinement configuration datum line 85, such lines illustrate a condition of operation wherein the maximum confining forces of 500 pounds is progressively applied with cushioned effect over an appreciable distance of suspension travel, with such progressive application commencing at 222 and reaching a maximum value at 223. Such progressive application of the confining force provides superior ride characteristics when the vehicle encounters bumps in negotiating a curve, with such arrangement being particularly advantageous in the lower ranges of centrifugal forces being encountered, since the application of the maximum confining force, as the suspension system moves from above datum 85 to below datum 85, has a more perceptible effect on ride when the vehicle is being subjected to the lower magnitudes of centrifugal force.

For purposes of illustrating structure adapted to effect the above described progressive application of the confining force, reference is made to FIGS. 11 and 12 which illustrate confining means 25 as being provided with an elongated position command orifice 230. The height H of the top of orifice 230 above the bottom of such orifice, at datum line 85, represents the distance of suspension travel over which the progressively increasing application of the confining force occurs. Such distance of suspension travel is also graphically represented at H in FIG. 7 and is arbitrarily illustrated as commencing at one inch above datum line 85 for the purpose of presenting a practical example.

In FIGS. 11 and 12, as piston 227 is moving downwardly after a protruding bump has been encountered by the vehicle, and with fluid being delivered out through position command orifice 230 by action of pump 70 as previously described, piston 27 will progressively close orifice 230, with such closure commencing when the under surface 229 of the piston 227 passes below the top orifice 230, and with such closure being completed when the under surface 229 of the piston passes the bottom of orifice 230. Hence it is seen that with the orifice type of FIGS. 11 and 12 the throttling of the fluid escape back to reservoir is progressively effected whereby the system is relatively gradually subjected to the maximum confining force and pressure.

As illustrated in FIG. 11, the piston 227 for confining means 25 can be provided with a unidirectional pressure actuated relief valve 250 which readily opens only on the upstroke of the piston. This relief valve 250 allows piston 227 to move rapidly upwardly when a bump is encountered despite the viscous drag and inertia of fluid in line 91. Relief valve 250 will close on the down-stroke to effect confinement. The pre-loaded pressure relief valve 112 can also be located in the same piston to function as previously described.

Reference is next made to FIGS. 9 and 10 which consist of graphical illustrations of the effect of road-imposed impacts on fluid pressures in the apparatuses illustrated in the preceding figures.

FIG. 9 illustrates the effects of certain road-imposed impacts on the apparatuses of FIGS. 1 and 2, with such impacts occurring at different magnitudes of centrifugal force as indicated at 231, 232, 233, 234, and 235.

FIG. 10 illustrates the effects said same road-imposed impacts would have on the apparatus of FIG. 3. Accordingly the two graphs of FIGS. 9 and 10 provide basis for comparing the operation of the apparatus types under road-imposed impacts at various magnitudes of centrifugal force.

As represented by the line 238 in FIG. 9, a typical yield value, or maximum confining pressure, of 500 p.s.i. isolates the system from any impact imposed pressures above such yield value. This is represented by the dotted impact portions of impacts 233, 234, and 235, which dotted portions extend above yield value line 238. Hence it is seen that the apparatus, of FIGS. 1 and 2, will only yield under the greater impacts 233 and 234. Yielding of the suspension to lesser impacts will occur only in the higher centrifugal force range as is illustrated by impact 235, with such impact 235 having its upper portion cut off at yield value line 238, and hence represented by dotted lines, only because such relatively small impact occurred at a higher centrifugal force value of 85 percent of maximum. Such yielding occurs, under relatively small impact 235, because the required confining pressure, represented by line 240, is relatively high whereby only a relatively small additional pressure, imposed by road impact, is required to exceed the yield pressure of the system.

Referring next to FIG. 10, which represents the apparatus of FIG. 3, the yield value of the confining pressure is represented by line 242 and is seen to be only slightly greater than the required confining pressure, again represented by line 240, for all values of centrifugal force encountered. This condition is provided by the variable control means 174 in the manner previously described and graphically illustrated in FIG. 8. It will be understood, from the graph of FIG. 10, that with the apparatus of FIG. 3, all of the impact conditions 231, 232, 234, and 235 effect yielding of the suspension since each of such impacts has a dotted line portion extended above the yield value line 242. This is true because only a small impact-imposed pressure is required to exceed the corresponding yield value pressure for any magnitude of centrifugal force encountered. Hence, as seen in FIG. 10, even the lesser road-imposed 231 and 232 will effect yielding of the suspension system at the lower range of centrifugal forces.

Since superior riding characteristics are obtained where the confining means is adapted to yield readily, to allow the wheel and unsprung weight to follow even slight road irregularities, it will be understood that the apparatus of FIG. 3 provides the ultimate in riding comfort, particularly in the lower centrifugal force range, wherein yieldability to lesser road impacts is maintained even at such lower centrifugal force values. At the same time the particular required confining force 240 is always present on the system but such force never exceeds a value just great enough to effect spring confinement against the particular existing centrifugal force value.

Referring now to FIG. 13, there is diagrammatically shown a steering column 301 which is rotated by a steering wheel 302. A hydraulically actuated motor controller is shown diagrammatically at 303. This control is of the conventional type used in certain current model automobiles of 1955. It is of the type in which it will connect a hydraulic motor to the steering column, to augment manual turning of the column, when a predetermined turning pressure is applied manually to the column, say two pounds. This motor is shown at 304 and is connected with the controller by hydraulic lines 305 and 306. Motor 304 is shown as of the reciprocating type which includes the conventional cylinder 308 and a piston (not shown), the latter being connected to a rack 309 which in turn drives a pinion 310 fastened to the steering column.

A restrictor usually in the form of a small orifice is provided at the inlet side 311 of the controller 303. This restrictor is indicated at 312. The outlet side 313 of the controller 303 is connected by line 75 to the low pressure side 314 of the pump 70. The high pressure outlet of pump 70 is shown at 315.

As previously stated, pump 70 is of the constant volume type and for this purpose, it is provided with a relief valve 317. This pump is conventional for certain current models automobile hydraulic steering mechanisms. In that product, the relief valve, diagrammatically shown at 317, is incorporated in the pump.

In this embodiment, all fluid passing from lines 90, 91, 99, and 92 to the reservoir 68 flows through the restrictor 312 of controller 303. As previously described, line 90 is connected with line 91 and 99 is connected with line 92. In this embodiment, lines 91 and 92 are connected at 319 to line 320, the latter leading to the restrictor 312.

As seen from FIG. 15, when the rod 78 of valve 62 is in its intermediate position 80, inlet port 72 is connected with the outlet port 76 and with ports 66 and 64. When the valve is shifted from its intermediate position 80 to the right that is to its 81 position, as shown in FIG. 17, port 72 is connected directly with port 64; port 76 is disconnected from port 72; and port 66 is directly connected with port 76. At this time and although port 76 is disconnected from the port 72, the flow of fluid to the controller 303 is assured, either through the chamber 31 of cylinder 25 or through fluid actuated valve means, or pressure control means 93; said valve 93 is shown here connected between line 73 and line 320 by lines 321 and 322. When the valve 62 is shifted from the 80 position to 82 position as shown in FIG. 16, port 72 is connected directly with port 66; port 76 is disconnected from port 72; and port 64 is directly connected with port 76. At this time and although port 76 is disconnected from the port 72, the flow of fluid to the controller 303 is assured, either through the chamber 52 of cylinder 46 or through fluid actuated valve means, or pressure control means 93.

Rod 78 is normally biased toward its intermediate position 80 and is shifted to its 81 or 82 positions, preferably, by solenoid mechanism controlled by a switch which is responsive to centrifugal force encountered by the vehicle as it negotiates curves to the right or left. For example, if the vehicle is negotiating a curve to the left and the radius of the curve and the speed of the vehicle are such as to warrant anti-roll control, the switch will energize the solenoid mechanism to shift valve 62 from its 80 position to its position 81 as shown in FIG. 17. As previously explained, port 72 is then connected with port 64. Due to centrifugal force action on the unsprung weight, the turning to the left, under such conditions, will tend to cause raising of the unsprung weight of the left side of the car carrying with it the cylinder 25. This results in a throttling action at the position command orifice; such throttling, however, is counteracted by a proportionate increase in pressure in lines 73 and 60, resulting in preventing further rise of cylinder 25 and the unsprung weight on the left side of the car. Sufficient liquid will continue to flow to the controller 303 either through orifice 87, lines 90, 11, and 320, or, if piston 27 materially impedes the flow through orifice 87, then in that event, the pressure in line 73 is such as to effect opening of fluid actuated valve means, or pressure control means 93. It has been found practical to effect opening of fluid actuated valve means, or pressure control means 93 when approximate 500 pounds per square inch is present in lines 73 and consequently in cylinder chamber 31.

It will be understood that when the vehicle is turned to the right, the right confining mechanism, including cylinder 46, piston 48 and orifice 98, functions the same as piston 27, cylinder 25 and orifice 87, after the valve is moved to its 82 position as shown in FIG. 16.

It is to be understood that when the vehicle is turned to the right, the right confining mechanism, including cylinder 46, piston 48 and orifice 98, functions the same as piston 27, cylinder 25 and orifice 87, after the valve is moved to its 82 position as shown in FIG. 16.

It is to be understood that the pressure capacity of the pump is considerably higher than the pressure setting of fluid actuated valve means, or pressure control means 93. For example, relief valve 317 can be set to open at 900 pounds per square inch.

Should the front wheel of vehicle encounter a bump while negotiating a curve, the frame merely moves a piston upwardly, forcing liquid from the upper chamber, for example, chamber 30, through line 90 to lower chamber 31 or at an increased pressure through lines 91 and 320, controller 313 and line 75 to reservoir. Should the front wheel of the vehicle encounter a hole and should the piston be lowered to materially impede the flow of liquid through an orifice, for example, orifice 87, then fluid actuated valve means, or pressure control means 93 will open, thus permitting a further downward movement of the piston, thus relieving the shock which ordinarily would be transmitted from the unsprung weight to the sprung weight.

Referring to FIG. 14, it will be seen that the pistons are each provided with a series of longitudinal holes 324 extending therethrough. The lower ends of the holes form seats 325 which are engaged by a ring shaped valve 326. This valve is yieldingly held against the seats by a spring 327, the latter being centrally carried by the rod 33. Should a wheel strike a bump in the road, the piston, subjected to the bump, can move upwardly readily since the spring 327 will yield under light pressure.

Referring now to FIG. 18, which is similar to the diagrammatical showing in FIG. 2, again the hydraulically actuated controller for the hydraulic motor 304 is shown at 303. Like in FIG. 13, lines 99, 92, 90, and 91 are connected at junction 319, and from junction 319, the liquid flows through line 320, restrictor 312, controller 303, and line 75 to reservoir 68. Here a relief valve 121 and 127 is provided are pistons 121 and 126, respectively, and the results accomplished by these valves are the same as explained with respect to fluid actuated valve means, or pressure control means 93 in the system shown in FIG. 13.

Again in FIG. 19, lines 92 and 91 are connected at junction 319, whence the liquid flows through line 320, restrictor 312, controller 303 and line 75 to reservoir 68. The system shown in FIG. 19 is similar to that shown in FIG. 3 but includes the power stering controller 303.

It will be understood that the inclusion of lines 91 and 92 provide for preventing unbalancing of the differential on opposite sides of valve 174, although the pressure is varied in piston chambers 150 and 151, lines 91 and 92, and 320 by reason of movement of the steering column under load condition i.e. when a power steering pressure is required by controller 303 of the power steering mechanism. Obviously, if the power steering back pressure increases the pressure in chambers 150 and 151, and in lines 91, 92, and 320, by manipulating of the steering column, the pressure on the under side of either of the pistons 148 or 153, i.e. in chambers 151 or 156, must be increased an amount equal to aforesaid back pressure in order to move the piston to or retain the same at the proper datum line. Thus the desired differential in pressure is maintained between opposite sides of the valve 174, for the proper functioning of the same, although the back pressure is materially varied in the functioning of controller 303.

The spool rod 78 is shifted from its position 80 to its position 81 and from position 80 to its position 82 automatically, respectively, when centrifugal force of a predetermined value is generated in negotiating left and right turns. This is accomplished electrically, and, for this purpose, I provide a mercury switch 330 including an arcuately shaped tube 331, containing a quantity of mercury 332 and two sets of contacts 333 and 334. Contacts 334 are adapted to be bridged by the mercury when centrifugal force of a predetermined value is generated in negotiating a left turn, and contacts 333 are adapted to be bridged by the mercury when centrifugal force of a predetermined value is generated in negotiating a right turn.

With reference to FIG. 20, bridging of contacts 334 will effect energization of relay coil 336 through a circuit including battery 337, wire 338, contact 334, and 336, thence to ground. The opposite side of the battery is grounded. Energization of coil 336 will effect upward movement of armature 340 to complete a circuit through solenoid coil 341, via battery 337, wires 338 and 342, armature 340, contact 344, wire 345, coil 341, thence to ground. To non-magnetic spool rod 78 carries an iron core 347. When coil 341 is energized, core 347 is moved to the right to carry the valve to its 81 position. As previously stated, spool rod 78 is normally biased by spring means (not shown) toward the 80 position; therefore, as long as the coil 341 is energized, spool rod 78 will remain in the 81 position, but as soon as said coil is deenergized, spool rod 78 will be automatically returned to the 80 position by said spring means. This deenergization occurs when there is no longer any need for anti-roll control, that is, after the mercury moves away from contacts 334.

The reverse of the above occurs for anti-roll control for a right curve. For this purpose there is provided a second relay coil 349 which is energized through the circuit including battery 337, wire 350, contacts 333, coil 349, to ground. Energization of coil 349 will effect energization of solenoid coil 352 through the circuit including battery 337, wire 350, and wire 353, relay armature 354, relay contact 355, wire 356, coil 352 and thence to ground. Of course, when this circuit is complete to solenoid coil 352, the core 347 will move the spool rod 78 to its 82 position. The valve rod 78 will remain in its 82 position until coil 352 is deenergized, at which time the spring means will move the rod 78 to its intermediate i.e. its 80 position.

The valves 62 employed in FIGS. 18 and 19 are functionally the same as the valve employed in FIG. 13. It should be noted that in the instance of each of the FIGS. 1 through 6, and FIGS. 13, 18 and 19, the various port interconnections for each of the valve positions 80, 81, and 82, are correctly numerically indicated in the diagrammatic views 15, 16, and 17.

While the forms of embodiments of the present invention as herein disclosed constitute preformed forms, it is to be understood that other forms might be adapted, all coming within the scope of the claims that follow.

I claim:

1. In an apparatus for controlling a vehicle suspension of the type that includes springs on opposite sides thereof operatively connected between sprung and unsprung weights; means for one of the springs between the sprung and unsprung weights at one side of the vehicle and another one of said suspension control means for the other of said springs between the sprung and unsprung weights at the other side of the vehicle, each of said suspension control means including a cylinder connected with one of the weights and a cooperating piston connected with the other of said weights; the combination of means for selectively connecting one of the suspension control means with a source of fluid pressure while isolating the other of said suspension control means from said source of pressure during the period when force is generated tending to tilt the vehicle due to negotiating a curve; means for selectively connecting the other of the suspension control means with a source of pressure while isolating the said one suspension control means from said source of pressure during the period when force is generated tending to tilt the vehicle due to negotiating a curve in the opposite direction; and means for effecting release of fluid when the pressure exceeds the predetermined pressure value required for stability of the vehicle which pressure is the result of shock due to road imposed impact.

2. In an apparatus for controlling a vehicle suspension having sprung and unsprung weights, the combination of a fluid system comprising a high pressure side and low pressure side including fluid energy translating means carried by said vehicle; suspension control means connected between the sprung and unsprung weights of said vehicle and including a first pressure chamber wherein fluid pressure from said translating means varies the effect of stored spring energy at one side of said vehicle; a second suspension control means connected between the sprung and unsprung weights of said vehicle and including a second pressure chamber wherein said fluid pressure from said translating means varies the effect of stored spring energy at the other side of said vehicle; valve means for selectively either connecting said first pressure chamber with the high pressure side of the translating means while isolating said second suspension control means from said high pressure side of translating means, or connecting said second pressure chamber with said high pressure side of the translating means while isolating said first suspension control means from said high pressure side of the translating means, said valve means serving to connect said suspension control means to said low pressure side during said isolation; and fluid pressure control means responsive to pressure in the high pressure side of the fluid system.

3. In an apparatus for controlling a vehicle suspension, the combination of fluid energy translating means carried by said vehicle; a cylinder and piston connected between the sprung and unsprung weight of the vehicle whereby relative movement between said sprung and unsprung weight effects reciprocating movement of said piston in said cylinder, said piston forming with said cylinder a pressure chamber communicating with said fluid energy translating means and isolated from a zone of low pressure and valve means between said fluid energy translating means and said pressure chamber responsive to relative movement between said sprung and unsprung weight of said vehicle, away from a predetermined configuration, said valve means including a fluid exit port along the side wall of said cylinder at a predetermined piston location corresponding to said predetermined configuration; and fluid conduit means connecting said exit with said zone of low pressure.

4. In an apparatus for controlling a vehicle suspension having sprung and unsprung weights, the combination of fluid system including fluid energy translating means carried by said vehicle; a cylinder and piston connected between the sprung and unsprung weight of the vehicle whereby relative movement between said sprung and unsprung weights effects reciprocating movement of said piston in said cylinder, said piston dividing said fluid system into a high pressure portion and a low pressure portion; valve means responsive to relative movement between said sprung and unsprung weights of said vehicle, away from a predetermined configuration, for effecting the by-pass of fluid from said high pressure portion of said system until said sprung and unsprung weights return to said predetermined configuration; and fluid pressure control means responsive to pressure in said high pressure portion of said circuit, said fluid pressure control means including a valve means between said high pressure portion and said low pressure portion of said system, said valve means being openable at a predetermined pressure.

5. Apparatus for improving the cornering characteristics of a sprung vehicle in negotiating a curve comprising, in combination, means for continuously translating fluid to fluid actuated spring confining means operative at the side of the vehicle towards the center of the curve; means for variably controlling the magnitude of fluid pressure in said confining means in proportion to variations in the magnitude of centrifugal force imposed on the vehicle whereby the magnitude of the fluid pressure in said confining means is variably maintained at a pressure required to effect spring confinement against a corresponding existing centrifugal force being encountered; and means for releasing fluid from said fluid being translated responsive to impact stresses imposed on said confining means by road imposed impacts, said fluid release being effected at various fluid pressures corresponding to said various required pressures.

6. In an apparatus for controlling a vehicle suspension having sprung and unsprung weights, the combination of fluid energy translating means carried by said vehicle; a cylinder and piston connected between the sprung and unsprung weight of the vehicle whereby relative movement between said sprung and unsprung weight effects reciprocating movement of said piston in said cylinder, said piston forming with said cylinder a pressure chamber connectable with said fluid energy translating means; and valve means between said fluid energy translating means and said pressure chamber responsive to relative movement between said sprung and unsprung weight of said vehicle, away from a predetermined configuration, said valve means including a fluid exit port means along the side wall of said cylinder whereby said fluid exit port opens and closes responsive to movement of said piston.

7. A hydraulic system for steering mechanism and roll control mechanism for a vehicle, comprising in combination with a manually operated steering mechanism; a motor for augmenting the manually operated steering mechanism; a hydraulically actuated controller for the motor, said controller having a liquid inlet side and a liquid outlet side; a hydraulic pump having a high pressure side and a low pressure side, the outlet side of said controller being connected to the low pressure side of said pump; means adapted to be connected between the sprung and unsprung weights of the vehicle, said means including a pair of hydraulic cylinders, one for each side of the vehicle, each of said cylinders carrying a piston, and each having conduit means connected therewith; a three position valve, said valve having an inlet connected with the high pressure side of the pump and having an outlet connected with the inlet side of the hydraulically actuated controller, said valve, when in one position, disconnecting the conduit means of one of said cylinders from the inlet of said valve when in another position, disconnecting the conduit means of the other cylinder from the inlet of the valve and connecting the same with the outlet of the valve, said valve having an intermediate position in which the conduit means of both cylinders are connected with the inlet and outlet of the valve; and means adapted to respond to centrifugal force, encountered in making a turn of the vehicle, for shifting said valve from the intermediate position to one of the other two positions.

8. A hydraulic system as defined in claim 7, characterized to include a pressure control means for relieving excess pressure in the cylinders.

9. A hydraulic system for steering mechanism and roll control mechanism for a vehicle, comprising, in combination, with a manually operated steering mechanism; a motor for augmenting the manually operated steering mechanism; a hydraulically actuated controller for the motor, said controller having a liquid inlet side and a liquid outlet side; a hydraulic pump having a high pressure side for delivering a flow of fluid to said controller and a low pressure side for the return of said flow to said pump; means adapted to be connected between the sprung and unsprung weights of the vehicle, said means including a pair of hydraulic cylinders, one for each side of the vehicle, each of said cylinders carrying a piston, and each having conduits connected with the opposite ends thereof, one conduit of each of said cylinders being connected with said flow of fluid; a three position valve, said valve having an inlet for receiving said flow from said high pressure side and for returning said flow to said low pressure side; an actuator for said valve for selectively shifting said valve to one position that disconnects the other of the two conduits of one of said cylinders from the inlet of the valve and connects the same with the outlet of the valve, or to another position that disconnects the other of the two conduits of the other of said cylinders from the inlet of the valve and connects the same with the outlet of the valve or for selectively shifting said valve to an intermediate position in which the four conduits of said cylinders are connected to the inlet and outlet of the valve; and means adapted to respond to centrifugal force, encountered in making a turn of the vehicle, for shifting said valve from the intermediate position to one of the other two positions.

10. A system as defined in claim 9 characterized to include means providing for the flow of liquid from the sides of the pistons to which the first mentioned conduits are connected to the other sides of the pistons, and a check valve in each of said last mentioned means for preventing the flow of fluid therethrough in the opposite direction.

11. A system as defined in claim 9 characterized in that the cylinders each include position command orifice intermediate the ends thereof, said orifices communicating with the first mentioned conduits of said cylinders, and further characterized to include means providing for the flow of liquid from the sides of the pistons to which the first mentioned conduits are connected to the other sides of the pistons, and a check valve in each of said last mentioned means for preventing the flow of fluid therethrough in the opposite direction.

12. In a suspension system for a vehicle having sprung and unsprung weights the combination of a source of pressurized fluid; chamber means including a first wall and communicating with said source, said chamber means being operatively connected to one of said weights of said vehicle; means forming a second wall and connected to the other of said weights of said vehicle, said second wall engaging said first wall and being reciprocally movable relative to said first wall responsive to relative movement between said sprung and unsprung weights away from a predetermined normal configuration; and position command valve means disposed along one of said walls and communicating with said chamber means and including an orifice which is opened and closed by the other of said walls responsive to relative movement between said sprung and unsprung weights away from said predetermined normal configuration.

13. The suspension system defined in claim 12 that includes a fluid actuated valve means communicating with said chamber.

14. In a suspension system for a vehicle having sprung and unsprung weights the combination of means forming a source of pressurized fluid; suspension control means connected between said weights and including a cylinder connected to one of said weights, a piston in said cylinder and connected to the other of said weights, a chamber in said cylinder and communicating with said source, a cylinder wall movable with one of said weights, and a second wall movable with the other of said weights, an orifice disposed along said cylinder wall and communicating with said chamber, said orifice defining a normal configuration datum position for said piston and cylinder, said orifice being opened and closed by the said second wall responsive to relative movement between said weights.

15. The suspension system defined in claim 14 that includes a fluid actuated valve means communicating with said chamber.

16. The suspension system defined in claim 14 wherein said piston includes passage means connecting upper and lower portions of said cylinder.

17. In a suspension system for a vehicle having sprung and unsprung weights the combination of pump means providing a constant volume flow of pressurized fluid; suspension control means connected between said weights and including a chamber for receiving said flow of pressurized fluid; a fluid motor for driving a powered component of said vehicle and including a second chamber for receiving said flow of pressurized fluid; and valve means operatively connected between said weights for controlling the release of fluid from said suspension control means; and a fluid actuated valve means operated by said fluid release from suspension control means.

18. In a suspension system for a vehicle having sprung and unsprung weights the combination of pump means providing a constant volume flow of pressurized fluid; suspension control means connected between said weights and including a chamber for receiving said flow of pressurized fluid; a fluid motor for driving a powered component of said vehicle and including a second chamber for receiving said flow of pressurized fluid; and valve means operatively connected between said weights for controlling the release of fluid from said suspension control means, said powered component consisting of a power steering apparatus.

19. In a suspension system for a vehicle having sprung and unsprung weights the combination of pump means providing a constant volume flow of pressurized fluid; suspension control means connected between said weights and including a chamber for receiving said flow of pressurized fluid; a fluid motor for driving a powered component of said vehicle and including a second chamber for receiving said flow of pressurized fluid; and valve means operatively connected between said weights for controlling the release of fluid from said suspension control means, said valve means comprises a first wall of said suspension control means movable with one of said weights, a second wall of said suspension control means movable with the other of said weights, a position command orifice disposed along one of said walls for the controlled release of fluid from said suspension control means, said orifice being opened and closed by the other of said walls responsive to relative movement between said weights.

20. In a suspension system for a vehicle having sprung and unsprung weights the combination of pump means providing a constant volume flow of pressurized fluid; suspension control means connected between said weights and including a cylinder connected to one of said weights, a piston in said cylinder and connected to the other of said weights, a chamber communicating with said flow, a first wall movable with one of said weights, and a second wall movable with the other of said weights; a fluid motor for driving a powered component of said vehicle and including a second chamber for receiving said flow of pressurized fluid; and valve means including an orifice disposed along one of said walls for controlling the release of fluid from said suspension control means, said orifice being opened and closed by the other of said walls responsive to relative movement between said weights.

21. The suspension system defined in claim 20 that includes a fluid actuated valve means operated by fluid released from said suspension control means.

22. The suspension system defined in claim 20 wherein said powered component consists of a power steering apparatus.

References Cited

UNITED STATES PATENTS

| | | | |
|---|---|---|---|
| 2,110,809 | 3/1938 | Murphy | 280—112.1 |
| 2,353,503 | 7/1944 | Rost | 280—112.1 |
| 2,684,254 | 7/1954 | Goss | 280—112.1 |
| 2,743,941 | 5/1956 | Walker | 280—112.1 |
| 2,756,046 | 7/1956 | Lucien | 267—15 |

FOREIGN PATENTS 670,361    4/1952    Great Britain.

PHILIP GOODMAN, *Primary Examiner.*